United States Patent
Furuta

(10) Patent No.: US 12,103,347 B2
(45) Date of Patent: Oct. 1, 2024

(54) DAMPING CONTROL DEVICE AND DAMPING CONTROL METHOD FOR VEHICLE

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 698 days.

(21) Appl. No.: 17/340,810

(22) Filed: Jun. 7, 2021

(65) Prior Publication Data

US 2021/0387498 A1    Dec. 16, 2021

(30) Foreign Application Priority Data

Jun. 10, 2020    (JP) ................................. 2020-101023

(51) Int. Cl.
*B60G 17/0165*    (2006.01)
*B60G 17/018*    (2006.01)

(52) U.S. Cl.
CPC ..... *B60G 17/0165* (2013.01); *B60G 17/0182* (2013.01); *B60G 2400/204* (2013.01); *B60G 2400/252* (2013.01); *B60G 2400/821* (2013.01); *B60G 2500/10* (2013.01); *B60G 2600/17* (2013.01); *B60G 2600/1875* (2013.01)

(58) Field of Classification Search
None
See application file for complete search history.

(56) References Cited

U.S. PATENT DOCUMENTS

| | | | |
|---|---|---|---|
| 5,740,039 A | 4/1998 | Hirahara et al. | |
| 11,584,182 B1* | 2/2023 | Smith | B60G 17/01933 |
| 2010/0324780 A1 | 12/2010 | Koumura et al. | |
| 2019/0143968 A1* | 5/2019 | Song | B60W 10/18 |
| 2019/0168563 A1 | 6/2019 | Barecke et al. | |
| 2020/0023705 A1 | 1/2020 | Hirao et al. | |
| 2022/0134831 A1* | 5/2022 | Akai | B60G 17/0165 701/37 |
| 2022/0161872 A1* | 5/2022 | Streit | B62D 33/0608 |

FOREIGN PATENT DOCUMENTS

| | | |
|---|---|---|
| DE | 102016216008 A1 | 3/2018 |
| DE | 112018001006 T5 | 11/2019 |
| JP | H05016636 A | 1/1993 |
| JP | H07215032 A | 8/1995 |
| JP | H08127213 A | 5/1996 |
| JP | 2009-096366 A | 5/2009 |
| JP | 2012-096700 A | 5/2012 |
| JP | 2016-107778 A | 6/2016 |
| JP | 2020-026187 A | 2/2020 |

* cited by examiner

*Primary Examiner* — Jaime Figueroa
*Assistant Examiner* — Arslan Azhar
(74) *Attorney, Agent, or Firm* — Dinsmore & Shohl LLP

(57) ABSTRACT

A damping control device for a vehicle includes a control force generating device configured to generate vertical control force between a vehicle body of the vehicle and at least one wheel suspended from the vehicle body by a suspension, and an electronic control unit configured to reduce, by controlling the control force generating device to change the control force, vibration of the vehicle body that is caused by vertical vibration occurring in the wheel in response to vertical road surface displacements while the vehicle is traveling, the vertical vibration being transmitted to the vibration of the vehicle body via the suspension.

6 Claims, 12 Drawing Sheets

FIRST CONTROL GAIN MAP $\beta 1(Va1, Va2)$

SECOND CONTROL GAIN MAP $\beta 2(Va1, Va2)$

DAMPING CONTROL DEVICE AND DAMPING CONTROL METHOD FOR VEHICLE

CROSS-REFERENCE TO RELATED APPLICATION

This application claims priority to Japanese Patent Application No. 2020-101023 filed on Jun. 10, 2020, incorporated herein by reference in its entirety.

BACKGROUND

1. Technical Field

The present disclosure relates to a damping control device and a damping control method for a vehicle. The present disclosure is used in, for example, a damping control device for a vehicle, which is configured to generate control force for reducing vibration of a sprung portion based on road surface displacement related values at a predicted passing position where a wheel is predicted to pass at a timing when a predetermined period has elapsed from a current time.

2. Description of Related Art

There are known suspensions that independently suspend wheels from a vehicle body. A suspension provided in a related device described in Japanese Unexamined Patent Application Publication No. 8-127213 (JP 8-127213 A) includes a suspension spring and a shock absorber. The related device estimates a vibration input F to be transmitted from an unsprung portion to a vehicle body by using Expression (A).

$$F = C \times (dz_0/dt) + K \times z_0 \quad (A)$$

C: damping coefficient of shock absorber
$z_0$: road surface displacement
K: spring rate of suspension spring The related device calculates target control force Fct for canceling out the vibration input F by using Expression (B), and causes an actuator to generate control force that agrees with the target control force Fct.

$$Fct = -\alpha \times F \quad (B)$$

$\alpha$: weighting factor; $0 \leq \alpha \leq 1$

The related device calculates a peak level value PL of the vibration input F in "low-frequency band including sprung resonance frequency" and a peak level value PH of the vibration input F in "high-frequency band including unsprung resonance frequency". When the peak level value PL is larger than the peak level value PH, the related device determines the weighting factor $\alpha$ as "a1". When the peak level value PL is smaller than the peak level value PH, the related device determines the weighting factor $\alpha$ as "a2 larger than a1". This is because human sensitivity in the high-frequency band is higher than that in the low-frequency band.

SUMMARY

Spring force to be theoretically generated in a suspension spring (hereinafter referred to as "theoretical spring force") is proportional to a vertical relative displacement between a wheel and a vehicle body. Damping force to be theoretically generated in a shock absorber (hereinafter referred to as "theoretical damping force") is proportional to a speed of the relative displacement. However, spring force to be actually generated in the suspension spring (actual spring force) tends to be larger than the theoretical spring force as the amplitude of vibration occurring in the wheel due to the road surface displacement $z_0$ (that is, the amplitude of the road surface displacement $z_0$) decreases. Similarly, damping force to be actually generated in the shock absorber (actual damping force) tends to be larger than the theoretical damping force as the amplitude decreases. Those phenomena may be caused by friction generated in the suspension.

Therefore, target control force larger than the target control force calculated based on Expression (B) is necessary as the amplitude decreases. However, the related device has difficulty in calculating the target control force necessary when the amplitude of the vibration occurring in the wheel is small because the related device determines the weighting factor $\alpha$ based on the magnitudes of the road surface displacement $z_0$ in the low-frequency band and in the high-frequency band. As a result, there is a strong possibility that the related device cannot damp the sprung portion when the amplitude of the vibration is small.

The present disclosure provides a damping control device for a vehicle, which can appropriately reduce the vibration of the sprung portion even when the amplitude of the vibration occurring in the wheel due to the road surface displacements is small.

A first aspect of the present disclosure relates to a damping control device. The damping control device includes control force generating device and an electronic control unit. The control force generating device is configured to generate vertical control force between a vehicle body of a vehicle and at least one wheel suspended from the vehicle body by a suspension. The electronic control unit is configured to reduce, by controlling the control force generating device to change the control force, vibration of the vehicle body that is caused by vertical vibration occurring in the wheel in response to vertical road surface displacements while the vehicle is traveling. The vertical vibration is transmitted to the vibration of the vehicle body via the suspension. The suspension is configured to generate, in a vertical direction between the wheel and the vehicle body, suspension force that is based on a relative displacement related value related to a vertical relative displacement between the wheel and the vehicle body. Suspension force to be actually generated by the suspension is larger than theoretical suspension force proportional to the relative displacement related value as an amplitude of the vibration occurring in the wheel due to the road surface displacements decreases. The electronic control unit is configured to calculate an amplitude index indicating an amplitude of road surface displacement related values related to the road surface displacements in a predetermined sampling zone, determine a control gain to increase, as the amplitude indicated by the amplitude index decreases, a magnitude of target control force that is a target value of the control force at a timing when a predetermined period has elapsed from a current time, calculate, based on the control gain and the road surface displacement related values at a predicted passing position where the wheel is predicted to pass at the timing when the predetermined period has elapsed from the current time, the target control force in a direction in which a component of the suspension force that corresponds to a value related to a vertical displacement of the wheel at the predicted passing position is canceled out, and control the control force generating device to generate the control force to agree with the target control force at the timing when the wheel passes through the predicted passing position.

When the amplitude of the road surface displacement related values in the sampling zone that is indicated by the amplitude index is small, there is a strong possibility that the actual suspension force to be generated by the suspension at the predicted passing position is larger than the theoretical suspension force. Therefore, the component of the suspension force that corresponds to the vertical displacement of the wheel at the predicted passing position increases as well. According to the first aspect, the control gain is determined to increase the magnitude of the target control force as the amplitude indicated by the amplitude index decreases, and the target control force is calculated by using the control gain. Thus, the component of the suspension force that corresponds to the value related to the vertical displacement of the wheel at the predicted passing position can securely be reduced even when the actual suspension force is larger than the theoretical suspension force due to the decrease in the amplitude of the vibration occurring in the wheel due to the road surface displacements. Accordingly, the vehicle body can be damped appropriately.

In the first aspect, the electronic control unit may be configured to calculate time series variations of the road surface displacement related values in the sampling zone based on a speed of the vehicle at the current time and the road surface displacement related values in the sampling zone, calculate a first amplitude index indicating an amplitude of road surface displacement related values in a predetermined first frequency band of the time series variations, calculate a second amplitude index indicating an amplitude of road surface displacement related values in a predetermined second frequency band of the time series variations that has a minimum frequency equal to or higher than a maximum frequency of the first frequency band, determine the control gain to increase as the amplitude indicated by the first amplitude index decreases, and to increase as the amplitude indicated by the second amplitude index decreases, and calculate the target control force by multiplying together the control gain and the road surface displacement related values at the predicted passing position. An increase amount of the control gain through a decrease in the amplitude indicated by the second amplitude index may be set larger than an increase amount of the control gain through a decrease in the amplitude indicated by the first amplitude index.

Due to a control delay of the control force generating device, a timing when the control force generating device generates the control force that agrees with the target control force (generation timing) may lag behind a timing when the wheel passes through the predicted passing position (passing timing). When the generation timing lags behind the passing timing in a case where the frequency of the road surface displacement related values in the sampling zone is high, road surface displacements at a contact position of the wheel at the generation timing may greatly differ from road surface displacements at the predicted passing position. In this case, the direction of the control force necessary for the road surface displacements at the contact position of the wheel at the generation timing may be opposite to the direction of the target control force necessary for the road surface displacements at the predicted passing position. If the control force generating device generates the control force in the opposite direction, the vehicle body is vibrated.

In the configuration described above, the increase amount of the control gain through the decrease in the amplitude of the road surface displacement related values in the high-frequency band in the sampling zone that is indicated by the second amplitude index may be set larger than the increase amount of the control gain through the decrease in the amplitude of the road surface displacement related values in the low-frequency band in the sampling zone that is indicated by the first amplitude index. Therefore, the control gain is determined to further decrease as the amplitude of the road surface displacement related values in the high-frequency band increases. Thus, smaller target control force is calculated. According to the configuration described above, even if the control force generating device generates the control force in the opposite direction because the generation timing lags behind the passing timing, the possibility that the vehicle body is greatly vibrated due to the control force can be reduced.

In the first aspect, the electronic control unit may be configured to calculate time series variations of the road surface displacement related values in the sampling zone based on a speed of the vehicle at the current time and the road surface displacement related values in the sampling zone, calculate a first amplitude index indicating an amplitude of road surface displacement related values in a predetermined first frequency band of the time series variations, calculate a second amplitude index indicating an amplitude of road surface displacement related values in a predetermined second frequency band of the time series variations that has a minimum frequency equal to or higher than a maximum frequency of the first frequency band, determine the control gain to decrease as a ratio of the amplitude indicated by the second amplitude index compared to the amplitude indicated by the first amplitude index increases, and calculate the target control force by multiplying together the control gain and the road surface displacement related values at the predicted passing position.

In the configuration described above, the electronic control unit may be configured to determine the control gain to decrease as the ratio of the amplitude indicated by the second amplitude index to the amplitude indicated by the first amplitude index increases. Since the control gain is determined to further decrease as the amplitude of the road surface displacement related values in the high-frequency band in the sampling zone increases, smaller target control force is calculated as the amplitude of the road surface displacement related values in the high-frequency band increases. According to the configuration described above, even if the control force generating device generates the control force in the opposite direction because the generation timing lags behind the passing timing, the possibility that the vehicle body is greatly vibrated due to the control force can be reduced.

In the first aspect, the suspension force may theoretically be represented by an expression including a spring term proportional to the relative displacement. A magnitude of a component corresponding to the spring term in the suspension force to be actually generated by the suspension may be larger than a magnitude of the spring term as the amplitude of the vibration occurring in the wheel due to the road surface displacements decreases. The electronic control unit may be configured to calculate the target control force at a magnitude of a value obtained by multiplying together the control gain and the road surface displacements determined based on the road surface displacement related values at the predicted passing position, and in a direction in which a component of the spring term that corresponds to the vertical displacement of the wheel at the predicted passing position is canceled out.

According to the configuration described above, the control gain is determined to increase the magnitude of the target control force as the amplitude of the road surface displacement related values in the sampling zone that is indicated by the amplitude index decreases. Thus, even if "magnitude of component corresponding to spring term in suspension force to be actually generated by suspension" is larger than the magnitude of the spring term due to the decrease in the amplitude, the component corresponding to the spring term in the suspension force that corresponds to the vertical displacement of the wheel at the predicted passing position can be reduced securely. Accordingly, the vehicle body can be damped appropriately.

In the first aspect, the suspension force may theoretically be represented by an expression including a damping term proportional to a speed of the relative displacement. A magnitude of a component corresponding to the damping term in the suspension force to be actually generated by the suspension may be larger than a magnitude of the damping term as the amplitude of the vibration occurring in the wheel due to the road surface displacements decreases. The electronic control unit may be configured to calculate the target control force at a magnitude of a value obtained by multiplying together the control gain and a time derivative of the road surface displacements determined based on the road surface displacement related values at the predicted passing position, and in a direction in which the component of the damping term that corresponds to a speed of the vertical displacement of the wheel at the predicted passing position is canceled out.

According to the configuration described above, the control gain is determined to increase the magnitude of the target control force as the amplitude of the vibration that is indicated by the amplitude index decreases. Thus, even if "magnitude of component corresponding to damping term in suspension force to be actually generated by suspension" is larger than the magnitude of the damping term due to the decrease in the amplitude of the vibration, the component corresponding to the damping term in the suspension force that corresponds to the speed of the vertical displacement of the wheel at the predicted passing position can be reduced securely. Accordingly, the vehicle body can be damped appropriately.

In the first aspect, the suspension force may theoretically be represented by an expression including a spring term proportional to the relative displacement and a damping term proportional to a speed of the relative displacement. A magnitude of a component corresponding to the spring term in the suspension force to be actually generated by the suspension may be larger than a magnitude of the spring term as the amplitude of the vibration occurring in the wheel due to the road surface displacements decreases. A magnitude of a component corresponding to the damping term in the suspension force to be actually generated by the suspension may be larger than a magnitude of the damping term as the amplitude of the vibration occurring in the wheel due to the road surface displacements decreases. The electronic control unit may be configured to determine a first control gain and a second control gain to increase the target control force as the amplitude indicated by the amplitude index decreases, calculate first target control force at a magnitude of a value obtained by multiplying together the first control gain and a time derivative of the road surface displacements determined based on the road surface displacement related values at the predicted passing position, and in a direction in which the component of the damping term that corresponds to a speed of the vertical displacement of the wheel at the predicted passing position is canceled out, calculate second target control force at a magnitude of a value obtained by multiplying together the second control gain and the road surface displacements determined based on the road surface displacement related values at the predicted passing position and in a direction in which the component of the spring term that corresponds to the vertical displacement of the wheel at the predicted passing position is canceled out, and control the control force generating device to generate resultant force of the first target control force and the second target control force at the timing when the wheel passes through the predicted passing position.

According to the configuration described above, the first control gain and the second control gain are determined to increase the magnitude of the target control force as the amplitude of the road surface displacement related values in the sampling zone that is indicated by the amplitude index decreases. Thus, even if "magnitude of component corresponding to spring term in suspension force to be actually generated by suspension" is larger than the magnitude of the spring term and "magnitude of component corresponding to damping term in suspension force to be actually generated by suspension" is larger than the magnitude of the damping term, the vehicle body can be damped appropriately.

A second aspect of the present disclosure relates to a damping control method. The damping control method is a damping control method for reducing, by controlling a control force generating device to change vertical control force, vibration of a vehicle body of a vehicle that is caused by vertical vibration occurring in at least one wheel suspended from the vehicle body by a suspension in response to vertical road surface displacements while the vehicle is traveling, the vertical vibration is transmitted to the vibration of the vehicle body, via the suspension. The control force generating device is configured to generate the control force between the wheel and the vehicle body. The suspension is configured to generate, in a vertical direction between the wheel and the vehicle body, suspension force that is based on a relative displacement related value related to a vertical relative displacement between the wheel and the vehicle body. Suspension force to be generated by the suspension is larger than theoretical suspension force proportional to the relative displacement related value as an amplitude of the vibration occurring in the wheel due to the road surface displacements decreases. The damping control method includes calculating an amplitude index indicating an amplitude of road surface displacement related values related to the road surface displacements in a predetermined sampling zone, determining a control gain to increase, as the amplitude indicated by the amplitude index decreases, a magnitude of target control force that is a target value of the control force at a timing when a predetermined period has elapsed from a current time, calculating, based on the control gain and the road surface displacement related values at a predicted passing position where the wheel is predicted to pass at the timing when the predetermined period has elapsed from the current time, the target control force in a direction in which a component of the suspension force that corresponds to a value related to a vertical displacement of the wheel at the predicted passing position is canceled out, and controlling the control force generating device to generate the control force to agree with the target control force at the timing when the wheel passes through the predicted passing position.

According to the second aspect, the control gain is determined to increase the magnitude of the target control force as the amplitude of the road surface displacement related values in the sampling zone that is indicated by the amplitude index decreases, and the target control force is calculated by using the control gain. Thus, the component of the suspension force that corresponds to the value related to the vertical displacement of the wheel at the predicted passing position can securely be reduced even when the actual suspension force is larger than the theoretical suspension force. Accordingly, the vehicle body can be damped appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Structure

A damping control device for a vehicle according to a first embodiment of the present disclosure (hereinafter referred to as "first device") is applied to a vehicle 10 illustrated in FIG. 1. As illustrated in FIG. 2, the first device is hereinafter referred to also as "damping control device 20".

Figure 1:
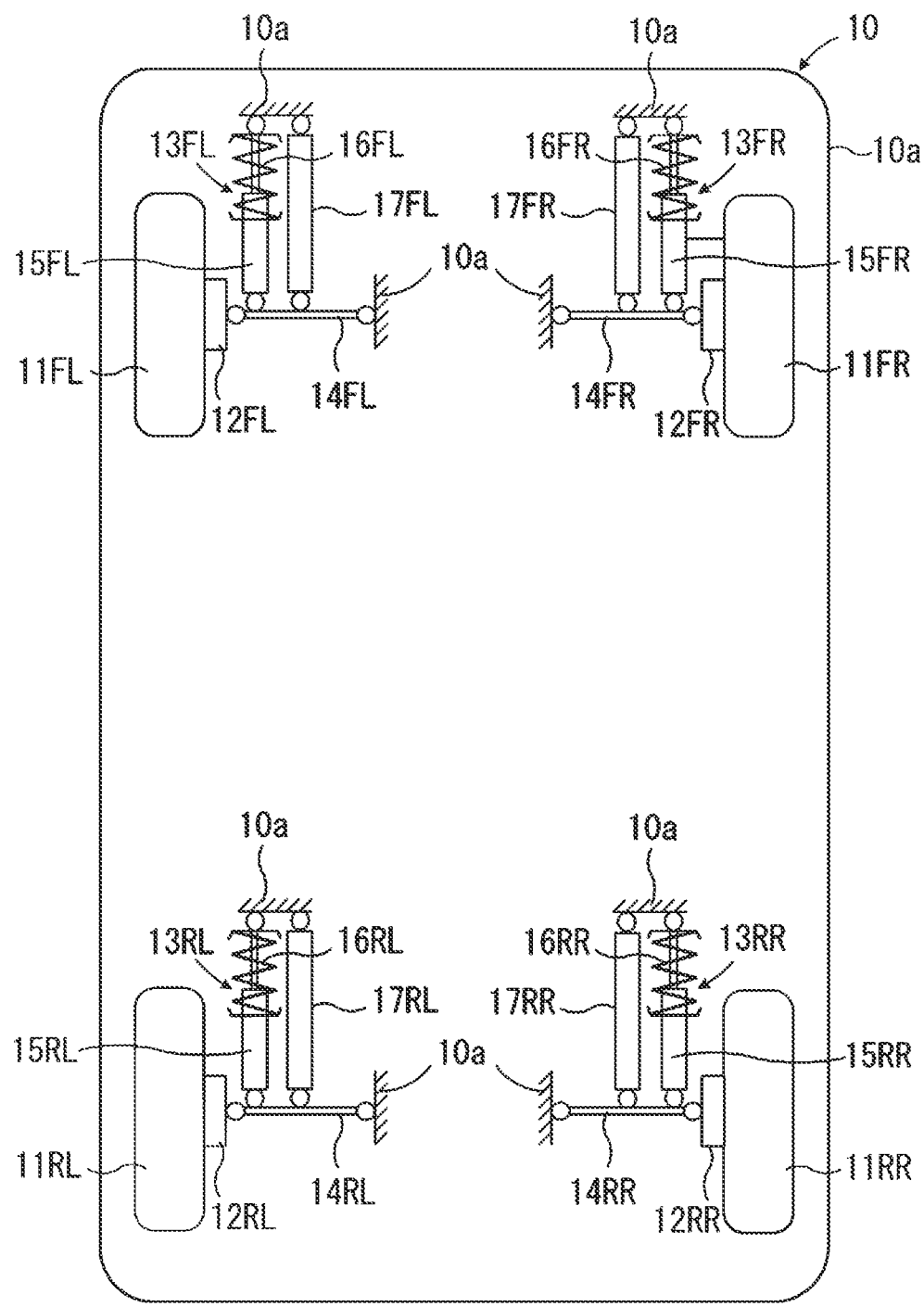
FIG. 1 is a schematic structural diagram of a vehicle to which a preview damping control device according to a first embodiment of the present disclosure (hereinafter referred to as "first device") is applied.
Figure 2:
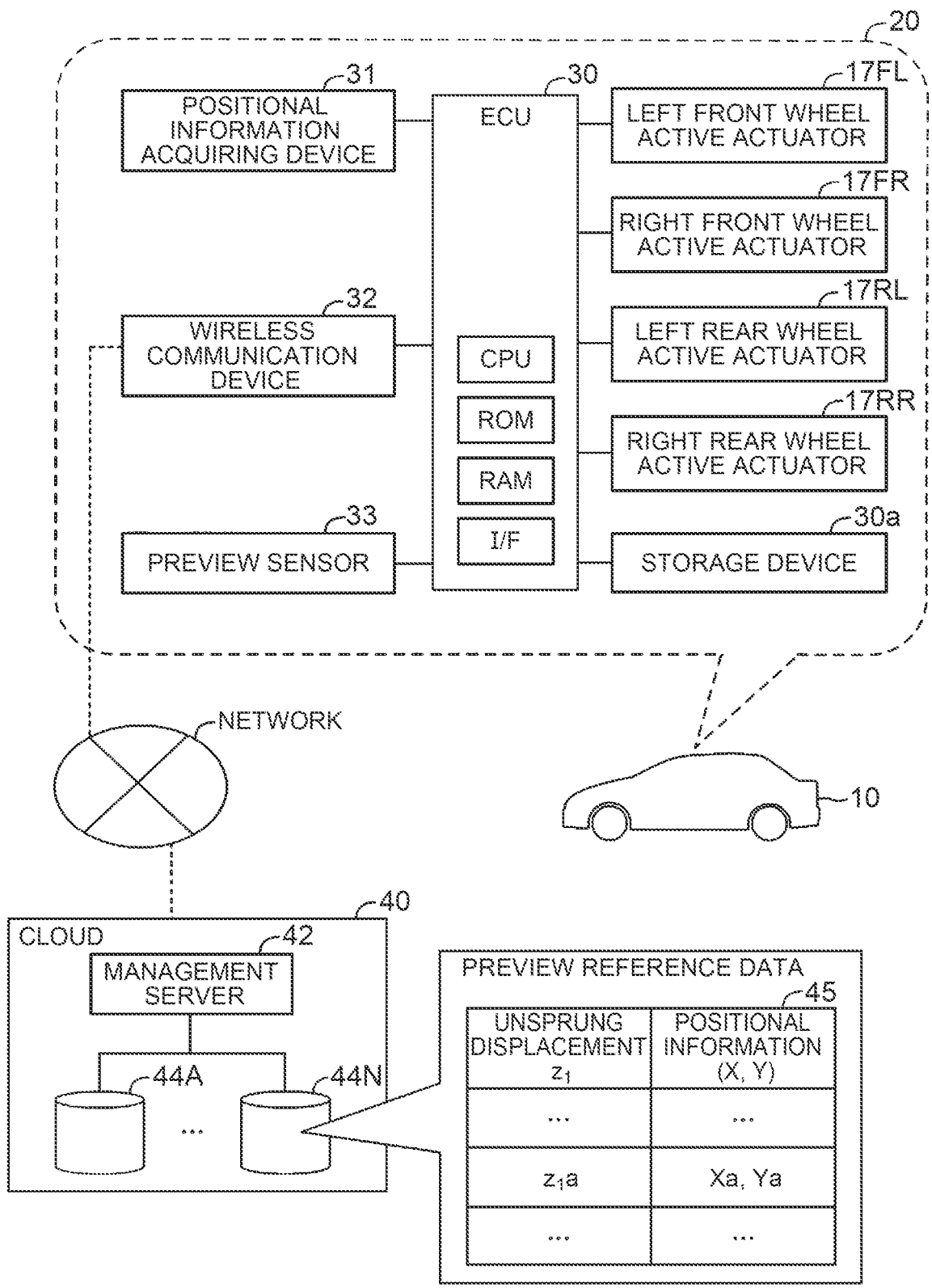
FIG. 2 is a schematic structural diagram of the first device.

As illustrated in FIG. 1, the vehicle 10 includes a right front wheel 11FR, a left front wheel 11FL, a right rear wheel 11RR, and a left rear wheel 11RL. The right front wheel 11FR is rotatably supported on a vehicle body 10a by a wheel support member 12FR. The left front wheel 11FL is rotatably supported on the vehicle body 10a by a wheel support member 12FL. The right rear wheel 11RR is rotatably supported on the vehicle body 10a by a wheel support member 12RR. The left rear wheel 11RL is rotatably supported on the vehicle body 10a by a wheel support member 12RL.

The right front wheel 11FR, the left front wheel 11FL, the right rear wheel 11RR, and the left rear wheel 11RL are referred to as "wheels 11" unless otherwise distinguished. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FR to 12RL are referred to as "wheel support members 12".

The vehicle 10 further includes a right front wheel suspension 13FR, a left front wheel suspension 13FL, a right rear wheel suspension 13RR, and a left rear wheel suspension 13RL. The suspensions 13FR to 13RL are independent suspensions, but other types of suspension may be employed. Details of the suspensions 13FR to 13RL are described below.

The right front wheel suspension 13FR suspends the right front wheel 11FR from the vehicle body 10a, and includes a suspension arm 14FR, a shock absorber 15FR, and a suspension spring 16FR. The left front wheel suspension 13FL suspends the left front wheel 11FL from the vehicle body 10a, and includes a suspension arm 14FL, a shock absorber 15FL, and a suspension spring 16FL.

The right rear wheel suspension 13RR suspends the right rear wheel 11RR from the vehicle body 10a, and includes a suspension arm 14RR, a shock absorber 15RR, and a suspension spring 16RR. The left rear wheel suspension 13RL suspends the left rear wheel 11RL from the vehicle body 10a, and includes a suspension arm 14RL, a shock absorber 15RL, and a suspension spring 16RL.

The right front wheel suspension 13FR, the left front wheel suspension 13FL, the right rear wheel suspension 13RR, and the left rear wheel suspension 13RL are referred to as "suspensions 13" unless otherwise distinguished. Similarly, the suspension arms 14FR to 14RL are referred to as "suspension arms 14". Similarly, the shock absorbers 15FR to 15RL are referred to as "shock absorbers 15". Similarly, the suspension springs 16FR to 16RL are referred to as "suspension springs 16".

The suspension arm 14 couples the wheel support member 12 to the vehicle body 10a. In FIG. 1, one suspension arm 14 is illustrated for one suspension 13, but a plurality of suspension arms 14 may be provided for one suspension 13.

The shock absorber 15 is arranged between the vehicle body 10a and the suspension arm 14, coupled to the vehicle body 10a at the upper end, and coupled to the suspension arm 14 at the lower end. The suspension spring 16 is resiliently mounted between the vehicle body 10a and the suspension arm 14 via the shock absorber 15. That is, the upper end of the suspension spring 16 is coupled to the vehicle body 10a, and the lower end of the suspension spring 16 is coupled to a cylinder of the shock absorber 15. In this resilient mounting structure of the suspension spring 16, the shock absorber 15 may be arranged between the vehicle body 10a and the wheel support member 12.

In this example, the shock absorber 15 is a non-adjustable shock absorber, but may be an adjustable shock absorber. The suspension spring 16 may resiliently be mounted between the vehicle body 10a and the suspension arm 14 without intervention of the shock absorber 15. That is, the upper end of the suspension spring 16 may be coupled to the vehicle body 10a, and the lower end of the suspension spring 16 may be coupled to the suspension arm 14. In this resilient mounting structure of the suspension spring 16, the shock absorber 15 and the suspension spring 16 may be arranged between the vehicle body 10a and the wheel support member 12.

Regarding the members such as the wheel 11 and the shock absorber 15 of the vehicle 10, a portion close to the wheel 11 with respect to the suspension spring 16 is referred to as "unsprung portion 50 or unsprung member 50 (see FIG. 3)". Regarding the members such as the vehicle body 10a and the shock absorber 15 of the vehicle 10, a portion close to the vehicle body 10a with respect to the suspension spring 16 is referred to as "sprung portion 51 or sprung member 51 (see FIG. 3)".

A right front wheel active actuator 17FR, a left front wheel active actuator 17FL, a right rear wheel active actuator 17RR, and a left rear wheel active actuator 17RL are provided between the vehicle body 10a and the suspension arms 14FR to 14RL, respectively. The active actuators 17FR to 17RL are provided in parallel to the shock absorbers 15FR to 15RL and the suspension springs 16FR to 16RL, respectively.

The right front wheel active actuator 17FR, the left front wheel active actuator 17FL, the right rear wheel active actuator 17RR, and the left rear wheel active actuator 17RL are referred to as "active actuators 17" unless otherwise distinguished. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 generates control force Fc based on a control command from an electronic control unit 30 illustrated in FIG. 2. The control force Fc is vertical force acting between the vehicle body 10a and the wheel 11 (that is, between the sprung portion 51 and the unsprung portion 50) to damp the sprung portion 51. The electronic control unit 30 is referred to as "ECU 30", and may be referred to as "control unit 30 or controller 30". The active actuator 17 may be referred to as "control force generating device 17". The active actuator 17 is an electromagnetic active suspension. The active actuator 17 serves as the active suspension in cooperation with, for example, the shock absorber 15 and the suspension spring 16.

As illustrated in FIG. 2, the damping control device 20 includes a storage device 30a, a positional information acquiring device 31, a wireless communication device 32, and a preview sensor 33 in addition to the ECU 30. The damping control device 20 further includes the active actuators 17FR to 17RL.

The ECU 30 includes a microcomputer. The microcomputer includes a CPU, a read-only memory (ROM), a random-access memory (RAM), and an interface (I/F). The CPU executes instructions (programs or routines) stored in the ROM to implement various functions.

The ECU 30 is connected to the non-volatile storage device 30a in which information is readable and writable. In this example, the storage device 30a is a hard disk drive. The ECU 30 can store (save) information in the storage device 30a, and can read information stored (saved) in the storage device 30a. The storage device 30a is not limited to the hard disk drive, and may be any storage device or storage medium in which information is readable and writable.

The ECU 30 is connected to the positional information acquiring device 31, the wireless communication device 32, and the preview sensor 33.

The positional information acquiring device 31 includes a global navigation satellite system (GNSS) receiver and a map database. The GNSS receiver receives "signal from artificial satellite (for example, GNSS signal)" for detecting a position of the vehicle 10 at a current time (current position). The map database stores road map information and the like. The positional information acquiring device 31 acquires the current position (for example, latitude and longitude) of the vehicle 10 based on the GNSS signal. Examples of the positional information acquiring device 31 include a navigation device.

The ECU 30 determines "traveling direction Td of vehicle 10" at a current time based on records of current positions acquired by the positional information acquiring device 31. The GNSS signal contains a moving speed, and the ECU 30 determines "vehicle speed V1 of vehicle 10" at a current time based on the moving speed contained in the GNSS signal.

The wireless communication device 32 is a wireless communication terminal for communicating information with a cloud 40 via a network. The cloud 40 includes "management server 42 and plurality of storage devices 44A to 44N" connected to the network. The one or more storage devices 44A to 44N are referred to as "storage devices 44" unless otherwise distinguished.

The management server 42 includes a CPU, a ROM, a RAM, and an interface (I/F). The management server 42 retrieves and reads data stored in the storage device 44, and writes data into the storage device 44.

The storage device 44 stores preview reference data 45. An unsprung displacement $z_1$ and positional information acquired when at least one of the vehicle 10 and other vehicles (hereinafter referred to as "collecting vehicle") has actually traveled on a road surface are registered in the preview reference data 45 while being linked to (associated with) each other. In other words, the collecting vehicle transmits a position of the wheel 11 of the traveling vehicle and an unsprung displacement $z_1$ at the position of the wheel 11 to the management server 42 in association with each other, and the management server 42 stores the position and the unsprung displacement $z_1$ in the storage device 44 as the preview reference data 45.

The unsprung displacement $z_1$ is a vertical displacement of the unsprung portion 50 (see FIG. 3) that vibrates in the vertical direction in response to a displacement of a road surface when the collecting vehicle travels along the road surface. The positional information is "information indicating position (for example, latitude and longitude) of wheel 11 where unsprung displacement $z_1$ is acquired" at a time when the unsprung displacement $z_1$ is acquired. The position of the wheel 11 is calculated based on a position of the vehicle 10 and a traveling direction Td of the vehicle. FIG. 2 illustrates an unsprung displacement "$z_1a$" and positional information "Xa, Ya" as examples of "unsprung displacement $z_1$ and positional information" registered as the preview reference data 45.

The preview sensor 33 may be an arbitrary preview sensor in this technical field as long as a value indicating a vertical displacement of a road surface ahead of the vehicle 10 (referred to as "road surface displacement $z_0$") can be acquired like, for example, a camera sensor, a Light Detection and Ranging (LIDAR) sensor, and a radar. The preview sensor 33 is used in a modified example described later.

The ECU 30 is connected to the right front wheel active actuator 17FR, the left front wheel active actuator 17FL, the right rear wheel active actuator 17RR, and the left rear wheel active actuator 17RL via drive circuits (not illustrated).

The ECU 30 calculates target control force Fct for damping the sprung portion 51 based on an unsprung displacement $z_1$ at a predicted passing position of each wheel 11 described later, and controls the active actuator 17 to generate control force Fc that corresponds to (agrees with) the target control force Fct when each wheel 11 passes through the predicted passing position.

Overview of Basic Preview Damping Control

Figure 3:
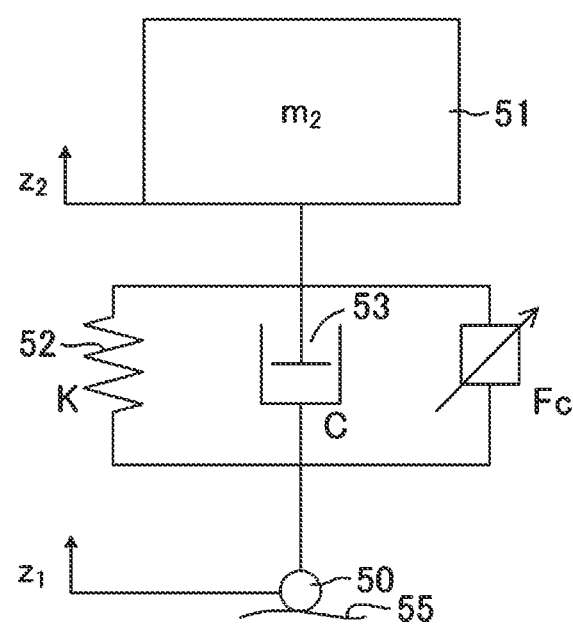
FIG. 3 is a diagram illustrating a single-wheel model of a vehicle.

An overview of basic preview damping control to be executed by the damping control device 20 is described below. FIG. 3 illustrates a single-wheel model of the vehicle 10 on a road surface 55.

A spring 52 corresponds to the suspension spring 16. A damper 53 corresponds to the shock absorber 15. An actuator 54 corresponds to the active actuator 17.

In FIG. 3, a mass of the sprung portion 51 is referred to as "sprung mass $m_2$". A vertical displacement of the unsprung portion 50 is referred to as "unsprung displacement $z_1$". A vertical displacement of the sprung portion 51 is referred to as "sprung displacement $z_2$". The sprung displacement $z_2$ is a vertical displacement of the sprung portion 51 associated with a position of each wheel 11. A spring rate of the spring 52 is referred to as "spring rate (equivalent spring rate) K". A damping coefficient of the damper 53 is referred to as "damping coefficient (equivalent damping coefficient) C". Force generated by the actuator 54 is referred to as "control force Fc".

Time derivatives of $z_1$ and $z_2$ are represented by "$dz_1$" and "$dz_2$", respectively. Second-order time derivatives of $z_1$ and $z_2$ are represented by "$ddz_1$" and "$ddz_2$", respectively. In the following description, an upward displacement of each of $z_1$ and $z_2$ is defined to be positive, and upward force generated by each of the spring 52, the damper 53, and the actuator 54 is defined to be positive.

In the single-wheel model of the vehicle 10 illustrated in FIG. 3, the sprung portion 51 vibrates because vertical vibration occurring in the unsprung portion 50 (wheel 11) in response to the road surface displacement $z_0$ is transmitted via the suspension 13. An equation of motion regarding a vertical motion of the sprung portion 51 can be represented by Expression (1).

$$m_2 ddz_2 = C(dz_1 - dz_2) + K(z_1 - z_2) - Fc \quad (1)$$

In Expression (1), the damping coefficient C is assumed to be constant. However, an actual damping coefficient changes depending on a stroke speed of the suspension 13. Therefore, the damping coefficient C may be set to, for example, a value that changes depending on a time derivative of a stroke H.

In Expression (1), "$C(dz_1-dz_2)$" is a term that represents theoretical force to be generated by the shock absorber 15 in proportion to a speed of a vertical relative displacement (stroke H) between the sprung portion 51 and the unsprung portion 50, and is referred to as "damping term". In Expression (1), "$K(z_1-z_2)$" is a term that represents theoretical force to be generated by the suspension spring 16 in proportion to the stroke H, and is referred to as "spring term". In Expression (1), "$C(dz_1-dz_2)+K(z_1-z_2)$" represents theoretical force to be generated by the suspension 13 (theoretical suspension force).

When the vibration of the sprung portion 51 is completely canceled out by the control force Fc (that is, when the sprung acceleration $ddz_2$, the sprung speed $dz_2$, and the sprung displacement $z_2$ are "0"), the control force Fc is represented by Expression (2).

$$Fc = Cdz_1 + Kz_1 \quad (2)$$

Thus, control force Fc for damping the vibration of the sprung portion 51 can be represented by Expression (3) by setting a control gain to α. The control gain α is an arbitrary constant larger than 0 and equal to or smaller than 1.

$$Fc = \alpha(Cdz_1 + Kz_1) \quad (3)$$

When Expression (3) is applied to Expression (1), Expression (1) can be represented by Expression (4).

$$m_2 ddz_2 = C(dz_1 - dz_2) + K(z_1 - z_2) - \alpha(Cdz_1 + Kz_1) \quad (4)$$

Expression (5) is obtained when Expression (4) is subjected to Laplace transform and the resultant expression is rearranged. That is, a transfer function from the unsprung displacement $z_1$ to the sprung displacement $z_2$ is represented by Expression (5). In Expression (5), "s" represents a Laplace operator.

$$\frac{z_2}{z_1} = \frac{(1-\alpha)(Cs+K)}{m_2 s^2 + Cs + K} \quad (5)$$

According to Expression (5), the transfer function changes depending on α. When α is an arbitrary value larger than 0 and equal to or smaller than 1, it is observed that the magnitude of the transfer function is securely smaller than "1" (that is, the vibration of the sprung portion 51 can be reduced). When α is 1, the magnitude of the transfer function is "0". Therefore, it is observed that the vibration of the sprung portion 51 is completely canceled out. The target control force Fct can be represented by Expression (6) based on Expression (3). In Expression (6), a gain β1 corresponds to αC, and a gain β2 corresponds to αK.

$$Fct = \beta_1 \times dz_1 + \beta_2 \times z_1 \quad (6)$$

The target control force Fct acts in a direction in which a component of suspension force that corresponds to the unsprung displacement $z_1$ at the predicted passing position is canceled out. That is, a damping-term corresponding component ($\beta \times dz_1$) of the target control force Fct acts in a direction in which a component ($C \times dz_1$) of the damping term that corresponds to the unsprung speed $dz_1$ at the predicted passing position is canceled out, and a spring-term corresponding component ($\beta \times z_1$) of the target control force Fct acts in a direction in which a component ($K \times z_1$) of the spring term that corresponds to the unsprung displacement $z_1$ at the predicted passing position is canceled out. The target control force Fct is force for reducing "vibration of unsprung portion 50 (wheel 11) due to road surface displacement $z_0$" to be transmitted to the sprung portion 51 (vehicle body 10a) via the suspension 13.

The ECU 30 calculates the target control force Fct by acquiring in advance (previewing) an unsprung displacement $z_1$ at a position where the wheel 11 passes in the future (predicted passing position), and applying the acquired unsprung displacement $z_1$ to Expression (6). The ECU 30 causes the actuator 54 to generate control force Fc corresponding to the target control force Fct at a timing when the wheel 11 passes through the predicted passing position (that is, at a timing when the unsprung displacement $z_1$ applied to Expression (6) occurs). With this configuration, the control force Fc reduces "vibration occurring in wheel 11 due to road surface displacement $z_0$ at predicted passing position"

to be transmitted to the sprung portion 51 via the suspension 13 when the wheel 11 passes through the predicted passing position (that is, when the unsprung displacement $z_1$ applied to Expression (6) occurs). Thus, the vibration of the sprung portion 51 (vehicle body 10a) can be reduced appropriately.

Figure 4:
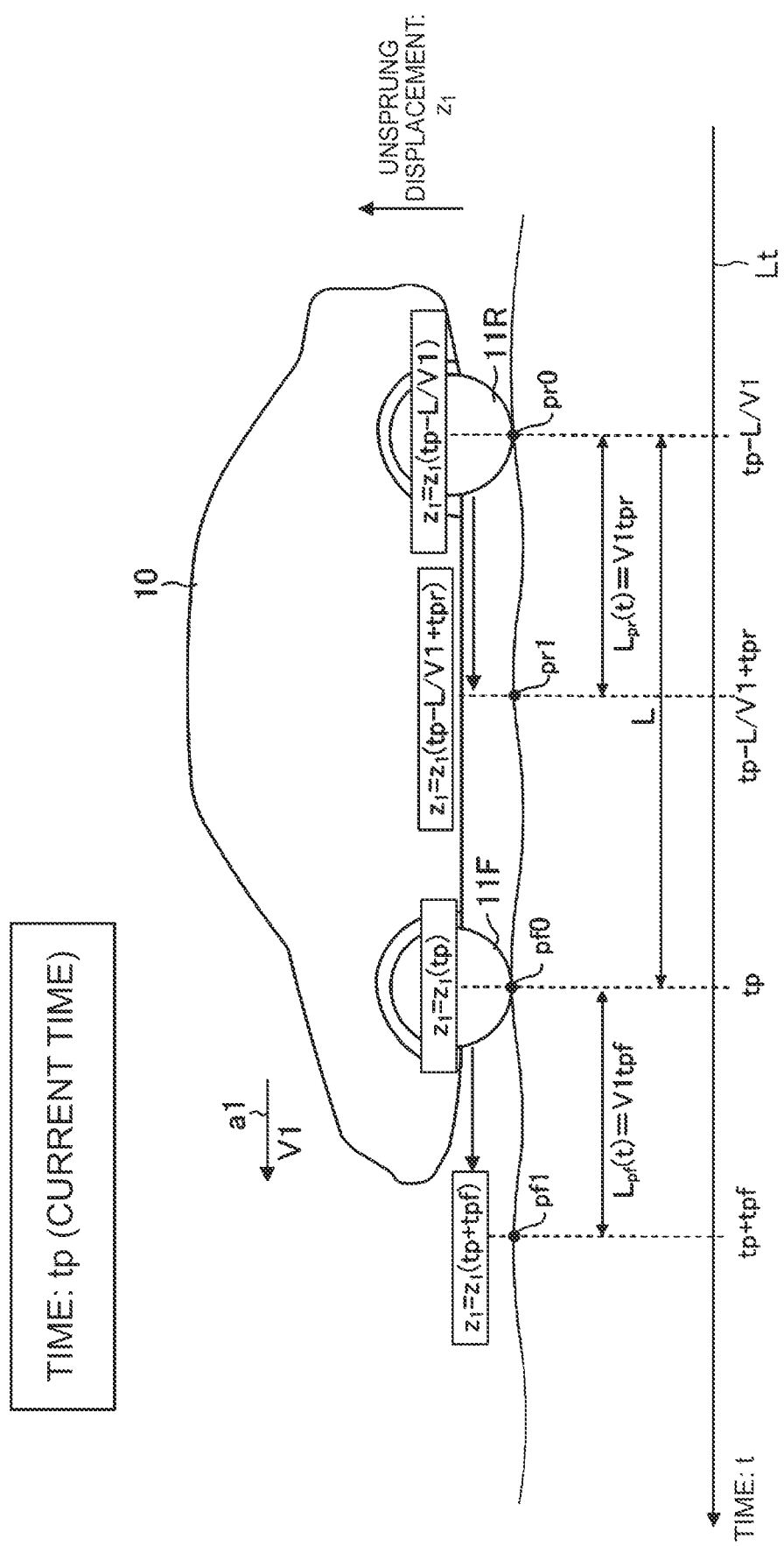
FIG. 4 is a diagram for describing preview damping control.

An example of the operation of the damping control device 20 is described below with reference to FIG. 4 to FIG. 6. FIG. 4 illustrates the vehicle 10 traveling at a vehicle speed V1 in a direction indicated by an arrow a1 at a current time tp. In the following description, the front wheel 11F and the rear wheel 11R are right or left wheels, and the moving speeds of the front wheel 11F and the rear wheel 11R are equal to the vehicle speed V1.

In FIG. 4, a line Lt is a virtual time axis t. Unsprung displacements $z_1$ of the front wheel 11F on a movement path at current, past, and future times t are represented by a function $z_1(t)$ of the times t. Thus, an unsprung displacement $z_1$ of the front wheel 11F at a position (contact position) pf0 at the current time tp is represented by $z_1(tp)$. An unsprung displacement $z_1$ of the rear wheel 11R at a position pr0 at the current time tp corresponds to an unsprung displacement $z_1$ of the front wheel 11F at a time "tp−L/V1" earlier than the current time tp by "period (L/V1) required for front wheel 11F to move by wheelbase L". Thus, the unsprung displacement $z_1$ of the rear wheel 11R at the current time tp is represented by $z_1(tp-L/V1)$.

First, preview damping control for the front wheel 11F is described. The ECU 30 determines a predicted passing position pf1 of the front wheel 11F at a time later (in the future) than the current time tp by a front wheel preview period tpf. The front wheel preview period tpf is preset to a period required from the timing when the ECU 30 determines the predicted passing position pf1 to the timing when the front wheel active actuator 17F outputs control force Fcf corresponding to target control force Fcft.

The predicted passing position pf1 of the front wheel 11F is a position spaced away from the position pf0 at the current time tp by a front wheel preview distance $L_{pf}$ (=V1×tpf) along a front wheel predicted movement path where the front wheel 11F is predicted to move. As described later in detail, the position pf0 is calculated based on a current position of the vehicle 10 that is acquired by the positional information acquiring device 31.

The ECU 30 acquires in advance a part of the preview reference data 45 in an area near the current position of the vehicle 10 (preparatory zone described later) from the cloud 40. The ECU 30 acquires an unsprung displacement $z_1(tp+tpf)$ based on the determined predicted passing position pf1 and the part of the preview reference data 45 acquired in advance.

The ECU 30 may acquire the unsprung displacement $z_1(tp+tpf)$ as follows. First, the ECU 30 transmits the determined predicted passing position pf1 to the cloud 40. The cloud 40 acquires the unsprung displacement $z_1(tp+tpf)$ linked to positional information indicating the predicted passing position pf1 based on the predicted passing position pf1 and the preview reference data 45. The cloud 40 transmits the unsprung displacement $z_1(tp+tpf)$ to the ECU 30.

The ECU 30 calculates an unsprung speed $dz_1(tp+tpf)$ that is a time derivative of the unsprung displacement $z_1(tp+tpf)$. The ECU 30 applies the unsprung speed $dz_1(tp+tpf)$ to an unsprung speed $dz_1$ in Expression (7), and applies the unsprung displacement $z_1(tp+tpf)$ to an unsprung displacement $z_1$ in Expression (7), thereby calculating target control force Fcft (=$\beta 1f \times dz_1(tp+tpf)+\beta 2f \times z_1(tp+tpf)$).

$$Fcft = \beta 1f \times dz_1 + \beta 2f \times z_1 \quad (7)$$

In Expression (7), "β1f" represents "front wheel first control gain β1f". In Expression (7), "β2f" represents "front wheel second control gain β2f".

The ECU 30 transmits a control command containing the target control force Fcft to the front wheel active actuator 17F to cause the front wheel active actuator 17F to generate control force Fcf that corresponds to (agrees with) the target control force Fcft.

Figure 5:
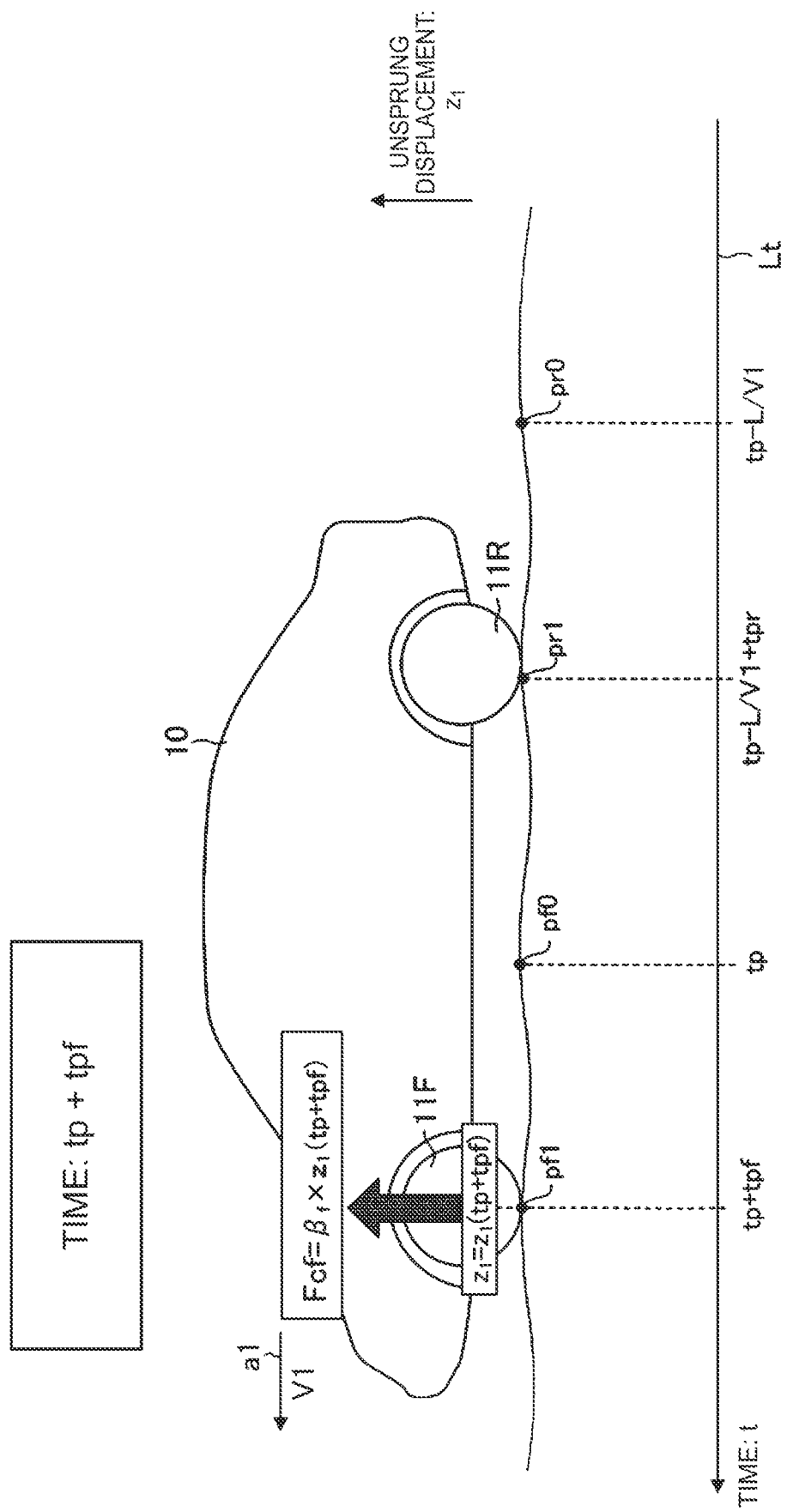
FIG. 5 is a diagram for describing the preview damping control.

As illustrated in FIG. 5, the front wheel active actuator 17F generates the control force Fcf corresponding to the target control force Fcft at "time tp+tpf" (that is, at a timing when the front wheel 11F actually passes through the predicted passing position pf1) later than the current time tp by the front wheel preview period tpf. Thus, the front wheel active actuator 17F can generate, at an appropriate timing, the control force Fcf capable of damping the vibration of the sprung portion 51 that occurs due to the unsprung displacement $z_1$ of the front wheel 11F at the predicted passing position pf1.

Next, preview damping control for the rear wheel 11R is described. The ECU 30 determines a predicted passing position pr1 of the rear wheel 11R at a time later (in the future) than the current time tp by a rear wheel preview period tpr. The rear wheel preview period tpr is preset to a period required from the timing when the ECU 30 determines the predicted passing position pr1 to the timing when the rear wheel active actuator 17R outputs control force Fcr corresponding to target control force Fcrt.

If the front wheel active actuator 17F and the rear wheel active actuator 17R are different, the front wheel preview period tpf and the rear wheel preview period tpr are preset to different values. If the front wheel active actuator 17F and the rear wheel active actuator 17R are the same, the front wheel preview period tpf and the rear wheel preview period tpr are preset to the same value.

The ECU 30 determines, as the predicted passing position pr1, a position spaced away from the position pr0 at the current time tp by a rear wheel preview distance $L_{pr}$ (=V1×tpr) along a predicted movement path of the rear wheel 11R under the assumption that the rear wheel 11R moves along the same path as that of the front wheel 11F. As described later in detail, the position pr0 is calculated based on the current position of the vehicle 10 that is acquired by the positional information acquiring device 31.

An unsprung displacement $z_1$ at the predicted passing position pr1 can be represented by $z_1(tp-L/V1+tpr)$ because this unsprung displacement $z_1$ occurs at a time later than "time (tp−L/V1) when front wheel 11F was located at position pr0 of rear wheel 11R at current time" by the rear wheel preview period tpr.

The ECU 30 acquires the unsprung displacement $z_1(tp-L/V1+tpr)$ based on the determined predicted passing position pr1 and the part of the preview reference data 45 acquired in advance.

The ECU 30 may acquire the unsprung displacement $z_1(tp-L/V1+tpr)$ as follows. First, the ECU 30 transmits the determined predicted passing position pr1 to the cloud 40. The cloud 40 acquires the unsprung displacement $z_1(tp-L/V1+tpr)$ linked to positional information indicating the predicted passing position pr1 based on the predicted passing position pr1 and the preview reference data 45. The cloud 40 transmits the unsprung displacement $z_1(tp-L/V1+tpr)$ to the ECU 30.

The ECU 30 calculates an unsprung speed $dz_1(tp-L/V1+tpr)$ that is a time derivative of the unsprung displacement $z_1(tp-L/V1+tpr)$. The ECU 30 applies the unsprung speed $dz_1(tp-L/V1+tpr)$ to an unsprung speed $dz_1$ in Expression (8), and applies the unsprung displacement $z_1(tp-L/V1+tpr)$ to an unsprung displacement $z_1$ in Expression (8), thereby calculating target control force Fcrt ($=(\beta1r \times dz_1(tp-L/V1+tpr)+\beta2r \times z_1(tp-L/V1+tpr))$.

$$Fcrt = \beta1r \times dz_1 + \beta2r \times z_1 \qquad (8)$$

In Expression (8), "β1r" represents "rear wheel first control gain β1r". In Expression (8), "β2r" represents "rear wheel second control gain β2r".

The front wheel first control gain β1f and the rear wheel first control gain β1r are set to different values. This is because a damping coefficient Cf of the right front wheel suspension 13FR and the left front wheel suspension 13FL differs from a damping coefficient Cr of the right rear wheel suspension 13RR and the left rear wheel suspension 13RL. If the damping coefficient Cf and the damping coefficient Cr are equal to each other, the front wheel first control gain β1f and the rear wheel first control gain β1r are set to the same value. The front wheel first control gain β1f and the rear wheel first control gain β1r are referred to as "first control gains β1" unless otherwise distinguished.

The front wheel second control gain β2f and the rear wheel second control gain β2r are set to different values. This is because a spring rate Kf of the right front wheel suspension 13FR and the left front wheel suspension 13FL differs from a spring rate Kr of the right rear wheel suspension 13RR and the left rear wheel suspension 13RL. If the spring rate Kf and the spring rate Kr are equal to each other, the front wheel second control gain β2f and the rear wheel second control gain β2r are set to the same value. The front wheel second control gain β2f and the rear wheel second control gain β2r are referred to as "second control gains β2" unless otherwise distinguished.

The ECU 30 transmits a control command containing the target control force Fcrt to the rear wheel active actuator 17R to cause the rear wheel active actuator 17R to generate control force Fcr that corresponds to (agrees with) the target control force Fcrt.

Figure 6:
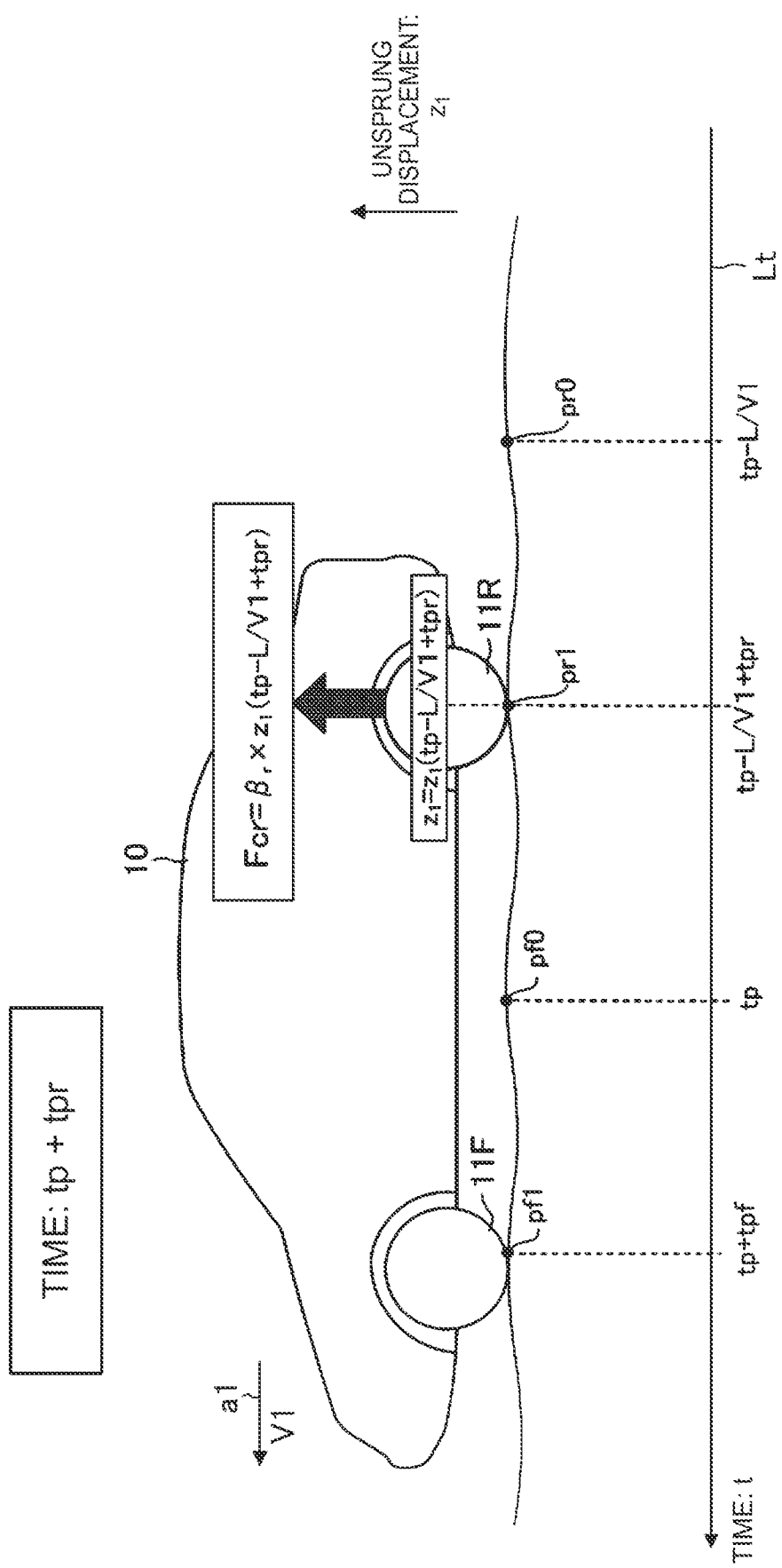
FIG. 6 is a diagram for describing the preview damping control.

As illustrated in FIG. 6, the rear wheel active actuator 17R generates the control force Fcr corresponding to the target control force Fcrt at "time tp+tpr" (that is, at a timing when the rear wheel 11R actually passes through the predicted passing position pr1) later than the current time tp by the rear wheel preview period tpr. Thus, the rear wheel active actuator 17R can generate, at an appropriate timing, the control force Fcr capable of appropriately damping the vibration of the sprung portion 51 that occurs due to the unsprung displacement $z_1$ of the rear wheel 11R at the predicted passing position pr1.

The control described above is damping control for the sprung portion 51, which is referred to as "preview damping control".

Overview of Operations

An overview of operations of the damping control device 20 is described below. The ECU 30 acquires, from the preview reference data 45, unsprung displacements $z_1$ (plurality of unsprung displacements $z_1$) linked to pieces of positional information corresponding to positions in a predetermined sampling zone Ssmp including a predicted passing position of each wheel 11, and acquires absolute values of the unsprung displacements $z_1$ as sampled displacements $z_1$smp. The ECU 30 calculates an amplitude index Va indicating an amplitude of the sampled displacements $z_1$smp. For example, the CPU calculates an average of the sampled displacements $z_1$smp as the amplitude index Va. In this example, the amplitude index Va indicates that the amplitude decreases as the value of the amplitude index Va decreases. An output value obtained by subjecting the sampled displacements $z_1$smp to low-pass filtering for passing only a frequency band equal to or lower than a predetermined cutoff frequency may be used as the average.

Figure 7:
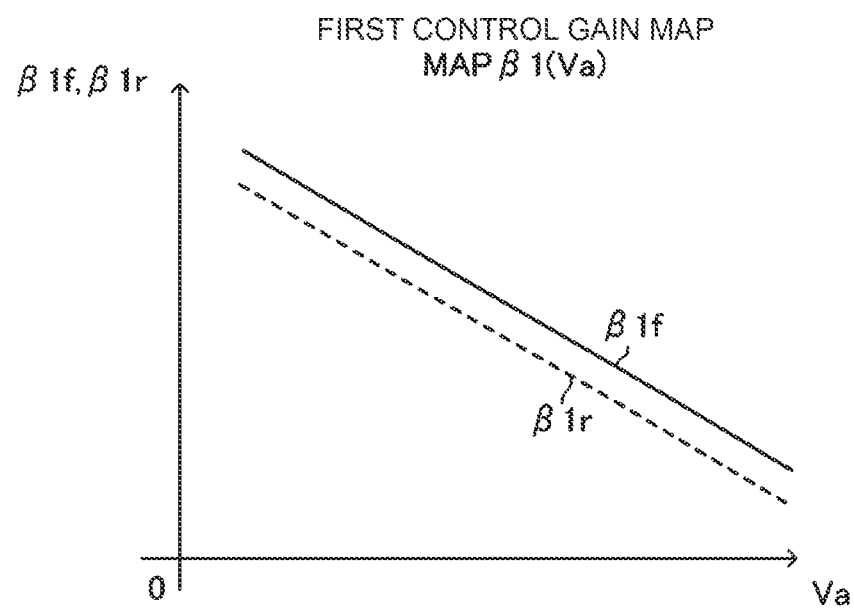
FIG. 7 is a diagram illustrating a first control gain map.

The ECU 30 acquires a front wheel first control gain β1f and a rear wheel first control gain β1r by applying the amplitude index Va to a first control gain map MAPβ1(Va) illustrated in FIG. 7. The ECU 30 acquires a front wheel second control gain β2f and a rear wheel second control gain β2r by applying the amplitude index Va to a second control gain map MAPβ2(Va) illustrated in FIG. 8.

The first control gain map MAPβ1(Va) is prestored in the ROM of the ECU 30. The first control gain map MAPβ1(Va) defines a relationship between the amplitude index Va and each of the front wheel first control gain β1f and the rear wheel first control gain β1r. According to the first control gain map MAPβ1(Va) illustrated in FIG. 7, the values of the front wheel first control gain β1f and the rear wheel first control gain β1r are defined to increase as the amplitude index Va decreases (in other words, decrease as the amplitude index Va increases). Similarly, according to the second control gain map MAPβ2(Va) illustrated in FIG. 8, the values of the front wheel second control gain β2f and the rear wheel second control gain β2r are defined to increase as the amplitude index Va decreases (in other words, decrease as the amplitude index Va increases).

The ECU 30 calculates front wheel target control force Fcft by applying the front wheel first control gain β1f and the front wheel second control gain β2f to Expression (7). Similarly, the ECU 30 calculates rear wheel target control force Fcrt by applying the rear wheel first control gain β1r and the rear wheel second control gain β2r to Expression (8).

As the amplitude indicated by the amplitude index Va decreases, damping force to be actually generated by the shock absorber 15 is larger than the theoretical damping force proportional to the stroke speed ($dz_1-dz_2$) and spring force to be actually generated by the suspension spring 16 is larger than the theoretical spring force proportional to the stroke ($z_1-z_2$) due to influence of friction of the suspension 13. That is, suspension force to be actually generated by the suspension 13 is larger than the theoretical suspension force. Therefore, a component of the suspension force that corresponds to the unsprung displacement $z_1$ at the predicted passing position to be reduced by the control force Fc increases. Since the values of the first control gain β1 and the second control gain β2 increase as the amplitude index Va decreases as described above, target control force Fct that is larger by an amount corresponding to the increase in the first control gain β1 and the second control gain β2 is calculated. According to this embodiment, the component of the suspension force that corresponds to the value related to the unsprung displacement $z_1$ at the predicted passing position can securely be reduced even when the amplitude of the sampled displacements $z_1$smp is small. Thus, the vibration of the sprung portion 51 can be reduced appropriately.

Specific Operations

Preview Damping Control Routine

The CPU of the ECU 30 ("CPU" hereinafter refers to the CPU of the ECU 30 unless otherwise noted) executes a preview damping control routine illustrated in a flowchart of FIG. 9 every time a predetermined period has elapsed.

Figure 9:
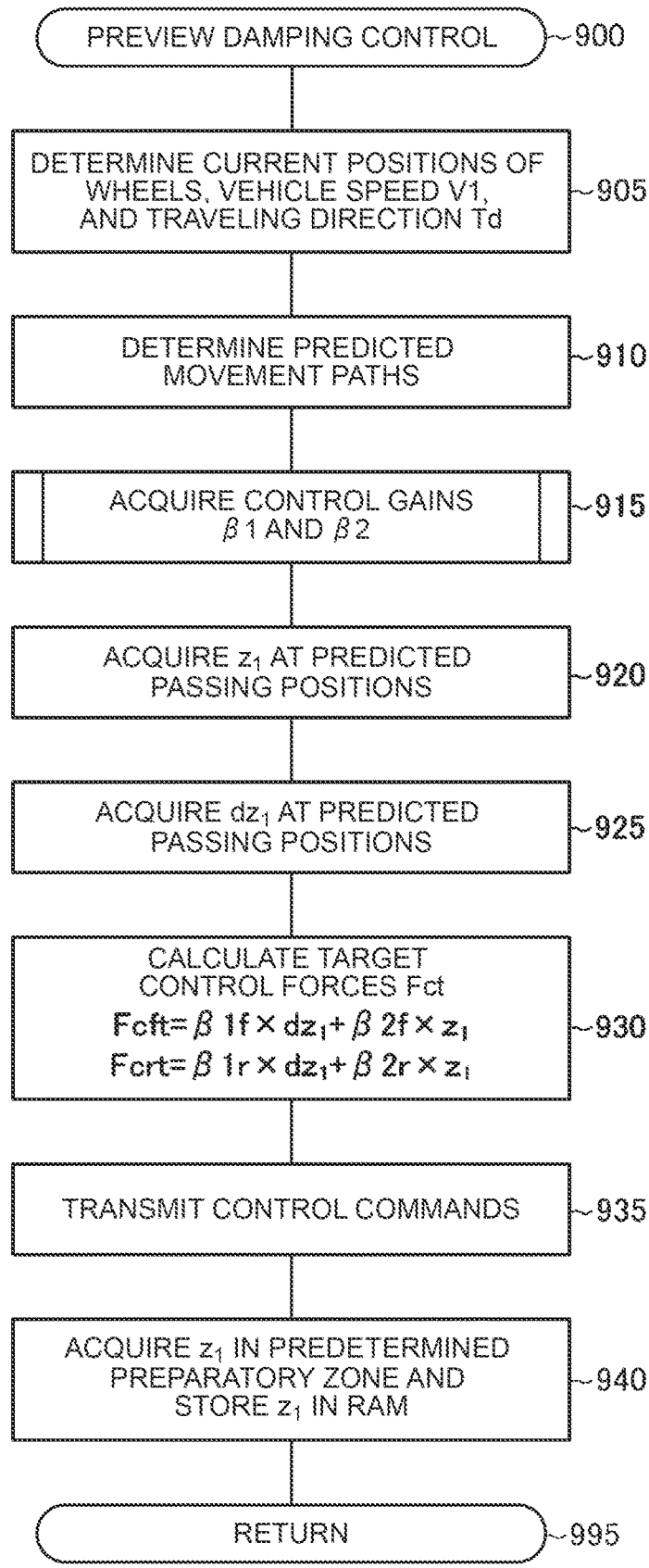
FIG. 9 is a flowchart illustrating a routine to be executed by a central processing unit (CPU) of an electronic control unit of the first device.

At a predetermined timing, the CPU starts a process from Step 900 of FIG. 9, and executes Step 905 to Step 940 in this order. Then, the CPU proceeds to Step 995 to temporarily terminate this routine.

Step 905: The CPU acquires information related to a current position of the vehicle 10 from the positional information acquiring device 31, and determines (acquires) current positions of the wheels 11, a vehicle speed V1, and a traveling direction Td of the vehicle 10.

More specifically, the CPU maps a current position in a previous case and a current position in a present case on the road map information contained in the map database, and determines, as the traveling direction Td of the vehicle 10, a direction from the current position in the previous case to the current position in the present case. The current position in the previous case means a current position of the vehicle 10 that is acquired by the CPU in Step 905 of the previously executed routine. The current position in the present case means a current position of the vehicle 10 that is acquired by the CPU in Step 905 of the present routine.

The ROM of the ECU 30 prestores positional relationship data indicating relationships between a mounting position of the GNSS receiver in the vehicle 10 and the positions of the wheels 11. The current position of the vehicle 10 that is acquired from the positional information acquiring device 31 corresponds to the mounting position of the GNSS receiver. Therefore, the CPU determines the current positions of the wheels 11 by referring to the current position of the vehicle 10, the traveling direction Td of the vehicle 10, and the positional relationship data. The GNSS signal received by the positional information acquiring device 31 contains information related to a moving speed. The CPU determines the vehicle speed V1 based on the GNSS signal.

Step 910: The CPU determines a front wheel predicted movement path and a rear wheel predicted movement path as follows. The front wheel predicted movement path is a path where the front wheel 11F is predicted to move in the future. The rear wheel predicted movement path is a path where the rear wheel 11R is predicted to move in the future. For example, the CPU determines the front wheel predicted movement path and the rear wheel predicted movement path based on the current positions of the wheels 11, the traveling direction Td of the vehicle 10, and the positional relationship data.

Step 915: The CPU executes a control gain acquisition routine for acquiring first control gains β1 and second control gains β2. The control gain acquisition routine is described in detail with reference to FIG. 10.

Step 920: The CPU acquires unsprung displacements $z_1$ at a front wheel predicted passing position pf1 and a rear wheel predicted passing position pr1 from the preview reference data 45 (see Step 940 described later) acquired in advance from the cloud 40. The unsprung displacements $z_1$ acquired in Step 920 may be referred to as "preview displacements $z_1$".

Step 925: The CPU calculates unsprung speeds $dz_1$ at the front wheel predicted passing position pf1 and the rear wheel predicted passing position pr1 by determining time derivatives of the unsprung displacements $z_1$ acquired in Step 920. The unsprung speeds $dz_1$ acquired in Step 925 may be referred to as "preview speeds $dz_1$".

Step 930: The CPU calculates target control force Fcft of the front wheel 11F by applying, to Expression (7), a front wheel first control gain β1f and a front wheel second control gain β2f acquired in the control gain acquisition routine described later, the preview displacement $z_1$ of the front wheel 11F, and the preview speed $dz_1$ of the front wheel 11F. The CPU calculates target control force Fcrt of the rear wheel 11R by applying, to Expression (8), a rear wheel first control gain β1r and a rear wheel second control gain β2r acquired in the control gain acquisition routine described later, the preview displacement $z_1$ of the rear wheel 11R, and the preview speed $dz_1$ of the rear wheel 11R.

Step 935: The CPU transmits a control command containing the target control force Fcft of the front wheel 11F to each front wheel active actuator 17F, and a control command containing the target control force Fcrt of the rear wheel 11R to each rear wheel active actuator 17R.

Step 940: When the front wheel predicted passing position pf1 reaches a position that is a predetermined distance back from the end point of the preparatory zone, the CPU acquires "unsprung displacements $z_1$ and pieces of positional information" in a new preparatory zone having a start point at the front wheel predicted passing position pf1 from the preview reference data 45 in the cloud 40, and stores the acquired unsprung displacements $z_1$ and the acquired pieces of positional information in the RAM.

The new preparatory zone has a start point at the front wheel predicted passing position pf1 that reaches the end point of the previous preparatory zone, and has an end point at a position spaced away from the front wheel predicted passing position pf1 by a predetermined preparatory distance along the front wheel predicted movement path. The preparatory distance is preset to a value sufficiently larger than the front wheel preview distance $L_{pf}$.

The process of Step 940 is described in detail. The CPU transmits an acquisition request containing positional information of the preparatory zone to the management server 42 via the wireless communication device 32. The management server 42 acquires, from the preview reference data 45, unsprung displacements $z_1$ linked to pieces of positional information corresponding to positions in the preparatory zone contained in the acquisition request, and transmits the pieces of positional information and the unsprung displacements $z_1$ to the damping control device 20. When the damping control device 20 receives the pieces of positional information and the unsprung displacements $z_1$, the CPU stores the received pieces of positional information and the received unsprung displacements $z_1$ in the RAM.

Control Gain Acquisition Routine

Figure 10:
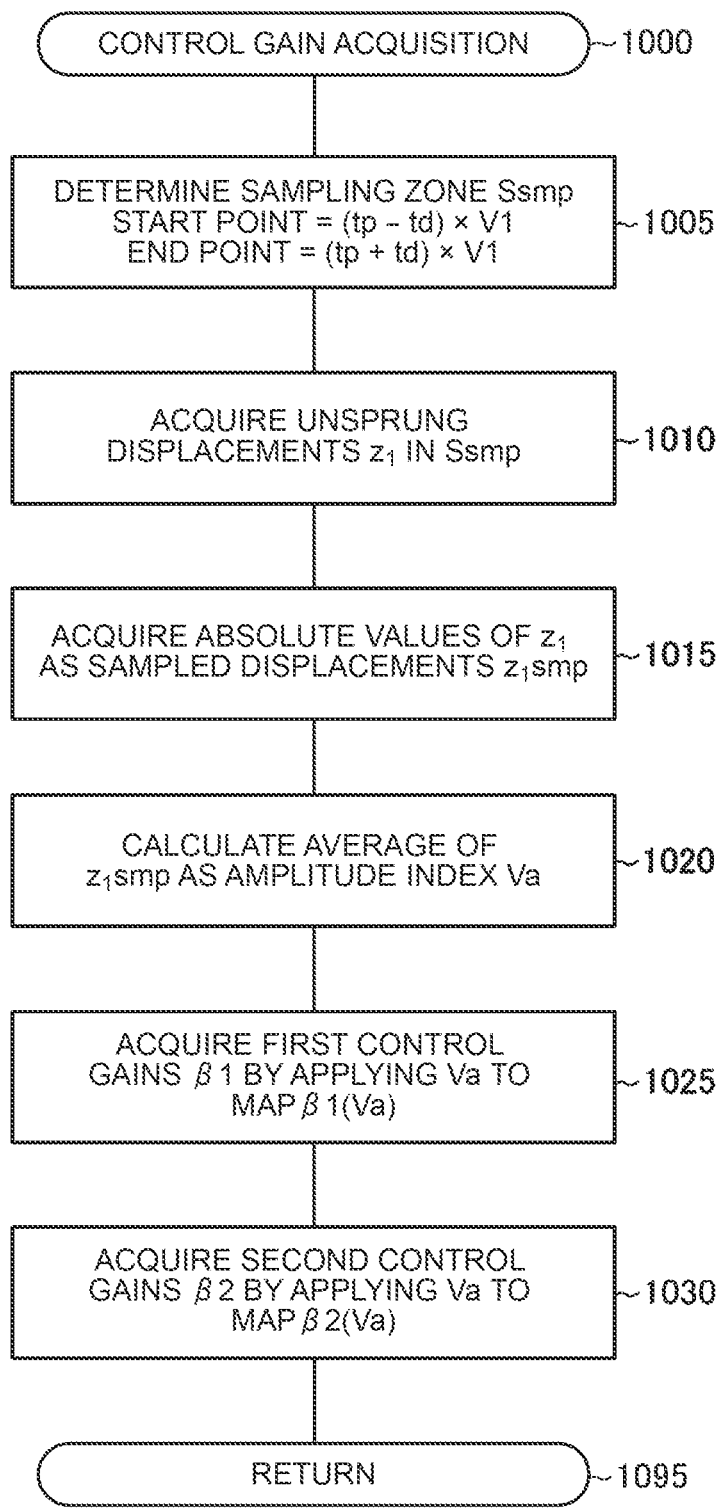
FIG. 10 is a flowchart illustrating a subroutine to be executed by the CPU of the electronic control unit in a control gain acquisition process of the routine illustrated in FIG. 9.

When the CPU proceeds to Step 915 of FIG. 9, the CPU starts a process of the control gain acquisition routine illustrated in a flowchart of FIG. 10 from Step 1000, and executes Step 1005 to Step 1030. Then, the CPU proceeds to Step 1095 to temporarily terminate this routine, and proceeds to Step 920 of FIG. 9.

Step 1005: The CPU determines a sampling zone Ssmp including a predicted passing position where each wheel 11 is expected to pass at a timing when a preview period (tpf, tpr) has elapsed from a current time. More specifically, the CPU determines, as a start point of the sampling zone Ssmp, a point shifted by a first distance L1 described later along the predicted movement path from the current position of each wheel 11. The CPU determines, as an end point of the sampling zone Ssmp, a point shifted by a second distance L2 described later along the predicted movement path from the current position of each wheel.

The CPU calculates the first distance L1 based on Expression (9), and the second distance L2 based on Expression (10).

$$L1 = (tp - td) \times V1 \tag{9}$$

$$L2 = (tp + td) \times V1 \tag{10}$$

In Expression (9) and Expression (10), "td" represents a predetermined period.

Step 1010: The CPU acquires unsprung displacements $z_1$ linked to pieces of positional information corresponding to positions in the sampling zone Ssmp from among "unsprung displacements $z_1$ in preparatory zone" acquired in advance from the preview reference data 45 in the cloud 40.

Step 1015: The CPU calculates absolute values of the unsprung displacements $z_1$ in the sampling zone Ssmp as sampled displacements $z_1$smp.

Step 1020: The CPU executes low-pass filtering for the sampled displacements $z_1$smp, and calculates an average of the sampled displacements $z_1$smp subjected to the low-pass filtering as an amplitude index Va. The low-pass filtering is a process for passing only a frequency band equal to or lower than a predetermined cutoff frequency.

Step 1025: The CPU acquires a front wheel first control gain $\beta 1f$ and a rear wheel first control gain $\beta 1r$ by applying the amplitude index Va to the first control gain map MAP$\beta 1$(Va).

Step 1030: The CPU acquires a front wheel second control gain $\beta 2f$ and a rear wheel second control gain $\beta 2r$ by applying the amplitude index Va to the second control gain map MAP$\beta 2$(Va).

Figure 8:
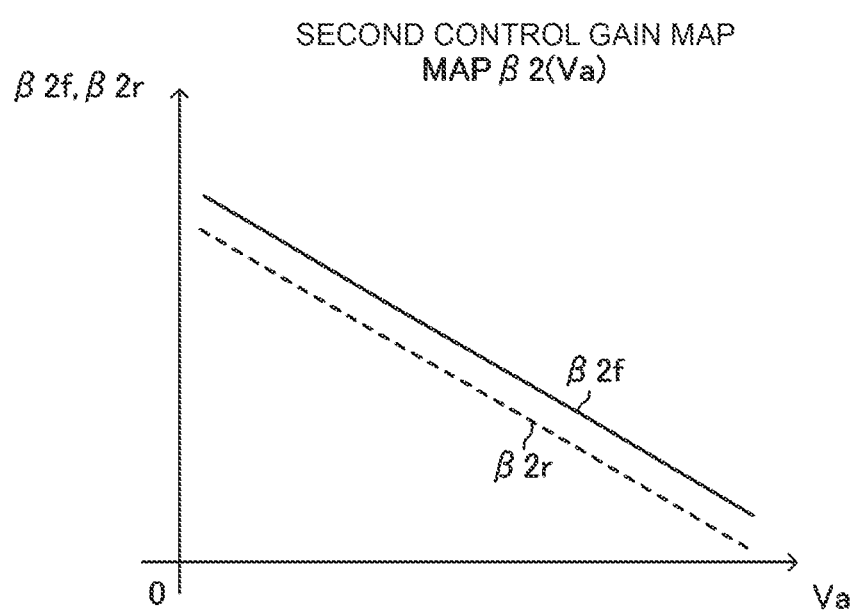
FIG. 8 is a diagram illustrating a second control gain map.

As illustrated in FIG. 7 and FIG. 8, the first control gain map MAP$\beta 1$(Va) and the second control gain map $\beta 2$(Va) are defined so that the first control gain $\beta 1$ and the second control gain $\beta 2$ increase as the amplitude indicated by the amplitude index Va decreases (that is, as the amplitude index Va decreases), respectively. Therefore, the first control gain $\beta 1$ and the second control gain $\beta 2$ are determined to be larger values as the amplitude of the sampled displacements $z_1$smp that is indicated by the amplitude index Va decreases. Thus, appropriate target control force Fct is calculated even when the amplitude decreases and the component of the suspension force that corresponds to the value related to the unsprung displacement $z_1$ at the predicted passing position increases. Accordingly, the vibration of the sprung portion 51 can be reduced appropriately even when the amplitude is small.

Second Embodiment

A damping control device 20 according to a second embodiment of the present disclosure (hereinafter referred to as "second device") is described with reference to FIG. 11 to FIG. 13.

Due to a control delay of the active actuator 17, a generation timing when the active actuator 17 generates the control force Fc that agrees with the target control force Fct may lag behind a passing timing when the wheel 11 passes through the predicted passing position. As a difference in the control force Fc generated by the active actuator 17 at the generation timing from "target control force Fct calculated based on unsprung displacement $z_1$ at position of wheel 11 at generation timing" (hereinafter referred to as "delayed control force difference") increases, the sprung portion 51 cannot be damped. On the contrary, the sprung portion 51 may be vibrated. There is a strong possibility that the delayed control force difference increases as the frequency of a road surface displacement $z_0$ of a road surface where the vehicle 10 travels increases. Therefore, there is also a strong possibility that the sprung portion 51 is vibrated greatly.

The ECU 30 of the second device extracts sampled displacements $z_1$smp in a first frequency band (low-frequency band) and sampled displacements $z_1$smp in a second frequency band (high-frequency band) based on time series variations of sampled displacements $z_1$smp when the vehicle 10 travels in the sampling zone at the vehicle speed V1 at a current time (that is, time series variations of road surface displacements $z_0$ in the sampling zone). The ECU 30 calculates, based on the sampled displacements $z_1$smp in the first frequency band, a first amplitude index Va1 indicating the magnitude of an amplitude of the sampled displacements $z_1$smp in the first frequency band. Similarly, the ECU 30 calculates, based on the sampled displacements $z_1$smp in the second frequency band, a second amplitude index Va2 indicating the magnitude of an amplitude of the sampled displacements $z_1$smp in the second frequency band.

Figure 11:
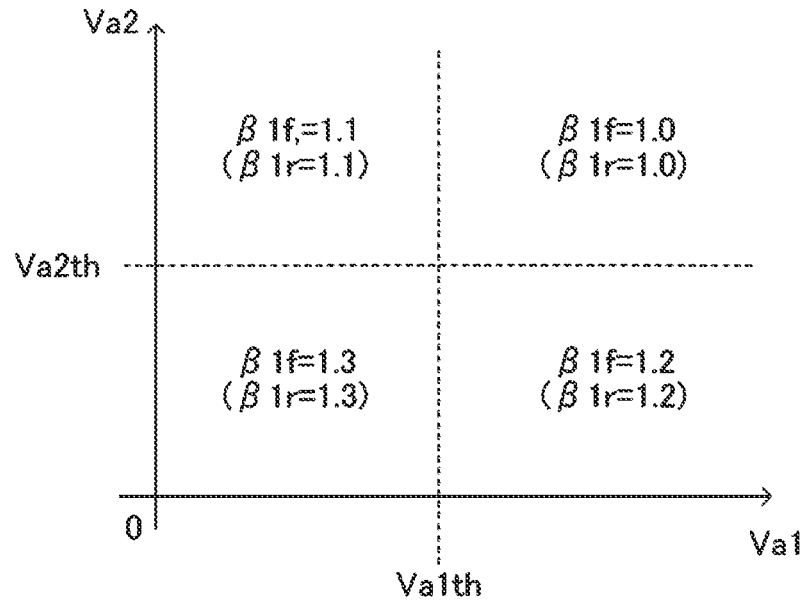
FIG. 11 is a diagram illustrating a first control gain map according to a second embodiment of the present disclosure.

The ECU 30 acquires a front wheel first control gain $\beta 1f$ and a rear wheel first control gain $\beta 1r$ by applying the first amplitude index Va1 and the second amplitude index Va2 to a first control gain map MAP$\beta 1$(Va1, Va2) illustrated in FIG. 11. The ECU 30 acquires a front wheel second control gain $\beta 2f$ and a rear wheel second control gain $\beta 2r$ by applying the first amplitude index Va1 and the second amplitude index Va2 to a second control gain map MAP$\beta 2$(Va1, Va2) illustrated in FIG. 12.

Figure 12:
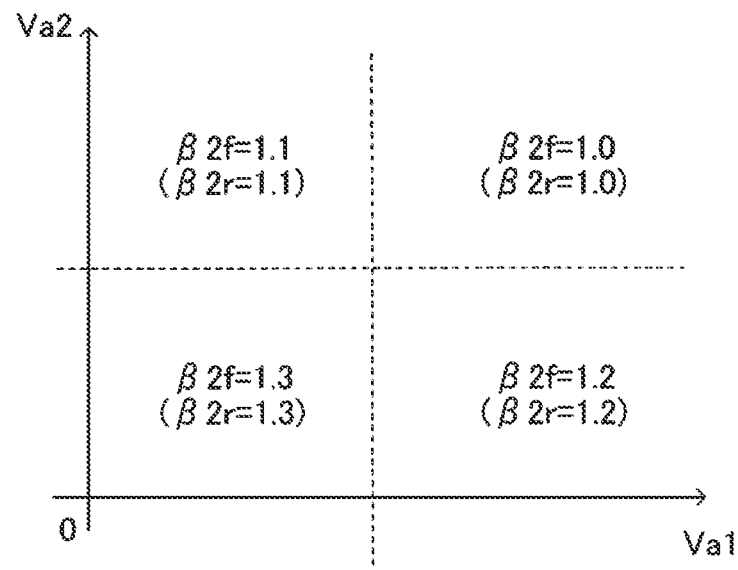
FIG. 12 is a diagram illustrating a second control gain map according to the second embodiment of the present disclosure.

The first control gain map MAP$\beta 1$(Va1, Va2) illustrated in FIG. 11 and the second control gain map MAP$\beta 2$(Va1, Va2) illustrated in FIG. 12 are prestored in the ROM of the ECU 30. As illustrated in FIG. 11, the first control gain map MAP$\beta 1$(Va1, Va2) defines relationships between the first control gains $\beta 1$ (front wheel first control gain $\beta 1f$ and rear wheel first control gain $\beta 1r$) and each of the first amplitude index Va1 and the second amplitude index Va2. According to the first control gain map MAP$\beta 1$(Va1, Va2), the value of the first control gain $\beta 1$ is defined to increase as the first amplitude index Va1 decreases (in other words, decrease as the first amplitude index Va1 increases), and increase as the second amplitude index Va2 decreases (in other words, decrease as the second amplitude index Va2 increases).

More specifically, according to the first control gain map MAP$\beta 1$(Va1, Va2), an increase amount of the first control gain $\beta 1$ through the decrease in the second amplitude index Va2 ($\beta 1f$: 1.1→1.3, 1.0→1.2; $\beta 1r$: 1.1→1.3, 1.0→1.2) is defined to be larger than an increase amount of the first control gain $\beta 1$ through the decrease in the first amplitude index Va1 ($\beta 1f$: 1.2→1.3, 1.0→1.1; $\beta 1r$: 1.2→1.3, 1.0→1.1). The first control gain $\beta 1f$ and the first control gain $\beta 1r$ may be set to different values.

As illustrated in FIG. 12, the second control gain map MAP$\beta 2$(Va1, Va2) defines relationships between the second control gains $\beta 2$ (front wheel second control gain $\beta 2f$ and rear wheel second control gain $\beta 2r$) and each of the first amplitude index Va1 and the second amplitude index Va2. According to the second control gain map MAP$\beta 2$(Va1, Va2), the value of the second control gain $\beta 2$ is defined to increase as the first amplitude index Va1 decreases (in other words, decrease as the first amplitude index Va1 increases), and increase as the second amplitude index Va2 decreases (in other words, decrease as the second amplitude index Va2 increases).

More specifically, according to the second control gain map MAP$\beta 2$(Va1, Va2), an increase amount of the second control gain $\beta 2$ through the decrease in the second amplitude index Va2 ($\beta 2f$: 1.1→1.3, 1.0→1.2; $\beta 2r$: 1.1→1.3, 1.0→1.2) is defined to be larger than an increase amount of the second control gain $\beta 2$ through the decrease in the first amplitude index Va1 ($\beta 2f$: 1.2→1.3, 1.0→1.1; $\beta 2r$: 1.2→1.3, 1.0→1.1). The second control gain $\beta 2f$ and the second control gain $\beta 2r$ may be set to different values. Further, the first control gain $\beta 1f$ and the second control gain $\beta 2f$ may be set to different values, and the first control gain $\beta 1r$ and the second control gain $\beta 2r$ may be set to different values.

As described above, when the amplitude of the sampled displacements $z_1$smp in the high-frequency band in the sampling zone Ssmp increases, the first control gain $\beta 1$ and the second control gain $\beta 2$ further decrease. Therefore, when the frequency of the sampled displacements $z_1$smp increases to increase the possibility that the delayed control force difference increases, the first control gain β1 and the second control gain β2 further decrease, and smaller target control force Fct is calculated. Thus, the delayed control force difference decreases. Accordingly, the possibility that the sprung portion 51 is vibrated greatly can be reduced even when the generation timing lags behind the passing timing.

Figure 13:
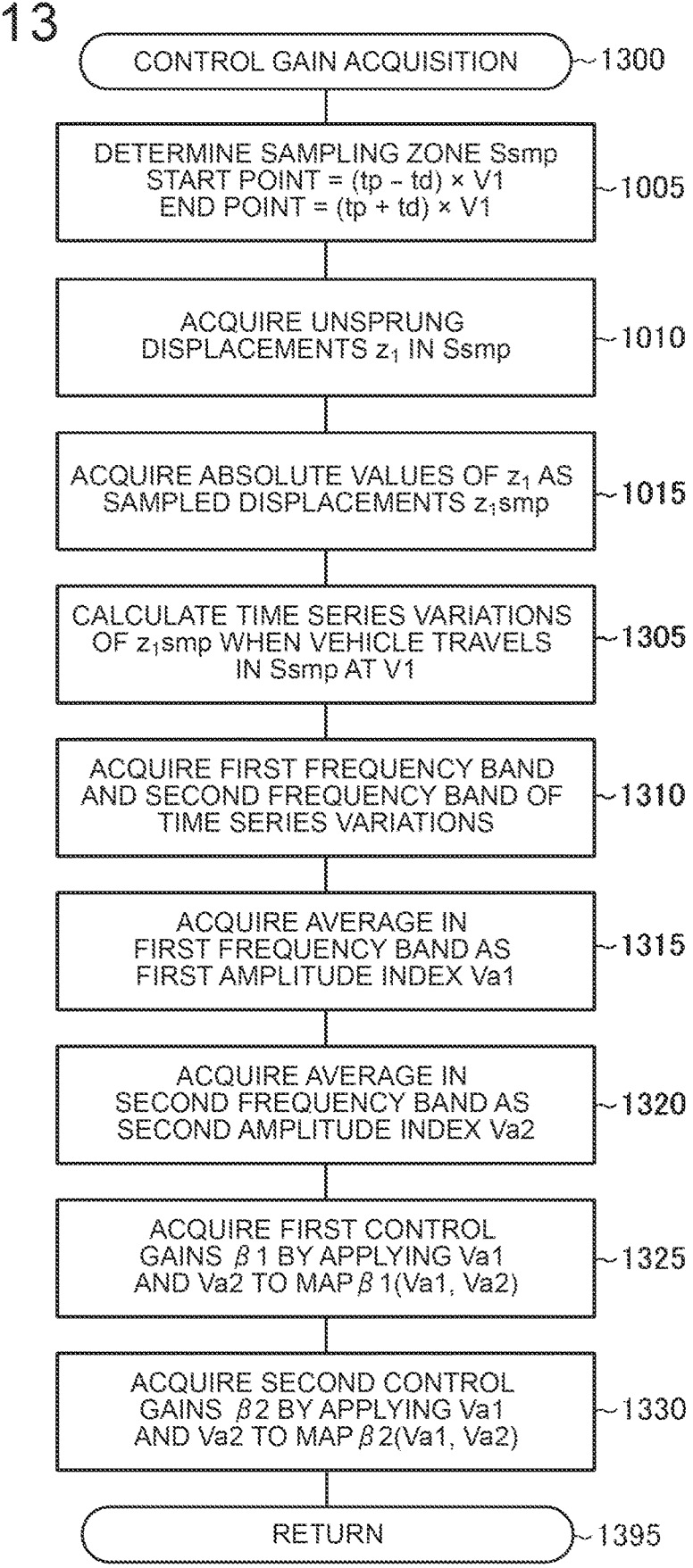
FIG. 13 is a flowchart illustrating a routine to be executed by a CPU of an electronic control unit of a preview damping control device according to the second embodiment of the present disclosure.

The CPU of the ECU 30 of this embodiment executes a control gain acquisition routine illustrated in FIG. 13 in place of the control gain acquisition routine illustrated in FIG. 10. In FIG. 13, steps for performing the same processes as those of the steps in FIG. 10 are represented by the same reference symbols as those used in FIG. 10 to omit their description.

When the CPU proceeds to Step 915 of FIG. 9, the CPU starts a process of the control gain acquisition routine illustrated in a flowchart of FIG. 13 from Step 1300, and executes Step 1005 to Step 1015.

The CPU executes Step 1305 to Step 1330, and proceeds to Step 1395 to temporarily terminate this routine.

Step 1305: The CPU calculates time series variations of the sampled displacements $z_1$smp when the vehicle 10 travels in the sampling zone Ssmp at the vehicle speed V1 at the current time.

Step 1310: The CPU extracts sampled displacements $z_1$smp in the first frequency band (first sampled displacements $z_1$smp) and sampled displacements $z_1$smp in the second frequency band (second sampled displacements $z_1$smp) from the time series variations.

More specifically, the CPU acquires the first sampled displacements $z_1$smp by subjecting the time series variations to "band-pass filtering for passing only first frequency band". Similarly, the CPU acquires the second sampled displacements $z_1$smp by subjecting the time series variations to "band-pass filtering for passing only second frequency band". The minimum frequency of the second frequency band is set to a value equal to or higher than the maximum frequency of the first frequency band.

Step 1315: The CPU executes low-pass filtering for the first sampled displacements $z_1$smp, and calculates an average of the first sampled displacements $z_1$smp subjected to the low-pass filtering as a first amplitude index Va1. The low-pass filtering is the same process as that of the low-pass filtering in Step 1020 of FIG. 10.

Step 1320: The CPU executes low-pass filtering for the second sampled displacements $z_1$smp, and calculates an average of the second sampled displacements $z_1$smp subjected to the low-pass filtering as a second amplitude index Va2. The low-pass filtering is the same process as that of the low-pass filtering in Step 1020 of FIG. 10.

Step 1325: The CPU acquires a front wheel first control gain β1f and a rear wheel first control gain β1r by applying the first amplitude index Va1 and the second amplitude index Va2 to the first control gain map MAPβ1(Va1, Va2).

Step 1330: The CPU acquires a front wheel second control gain β2f and a rear wheel second control gain β2r by applying the first amplitude index Va1 and the second amplitude index Va2 to the second control gain map MAPβ2 (Va1, Va2).

As understood from the above, in a case where the amplitude of the sampled displacements $z_1$smp in the high-frequency band is predicted to increase, the values of the first control gain β1 and the second control gain β2 are determined to decrease as compared to a case where the amplitude of the sampled displacements $z_1$smp in the low-frequency band is predicted to increase. Therefore, the target control force Fct is reduced. Thus, when there is a strong possibility that the delayed control force difference increases, the delayed control force difference can be reduced. Accordingly, the possibility that the sprung portion 51 is vibrated can be reduced even when the generation timing lags behind the passing timing.

The first control gain map MAPβ1(Va1, Va2) and the second control gain map MAPβ2(Va1, Va2) are not limited to those in the examples illustrated in FIG. 11 and FIG. 12, respectively. For example, the first control gain map MAPβ1 (Va1, Va2) and the second control gain map MAPβ2(Va1, Va2) may be preset so that the first control gain β1 and the second control gain β2 increase in proportion to a decrease in the first amplitude index Va1, and increase in proportion to a decrease in the second amplitude index Va2.

Modified Example of Second Embodiment

The ECU 30 of this modified example calculates a ratio RT of "second amplitude index Va2 calculated in Step 1320" to "first amplitude index Va1 calculated in Step 1315". The ECU 30 acquires a front wheel first control gain β1f and a rear wheel first control gain β1r by applying the ratio RT to a first control gain map MAPβ1(RT) illustrated in FIG. 14. The ECU 30 acquires a front wheel second control gain β2f and a rear wheel second control gain β2r by applying the ratio RT to a second control gain map MAPβ2(RT) illustrated in FIG. 15.

Figure 14:
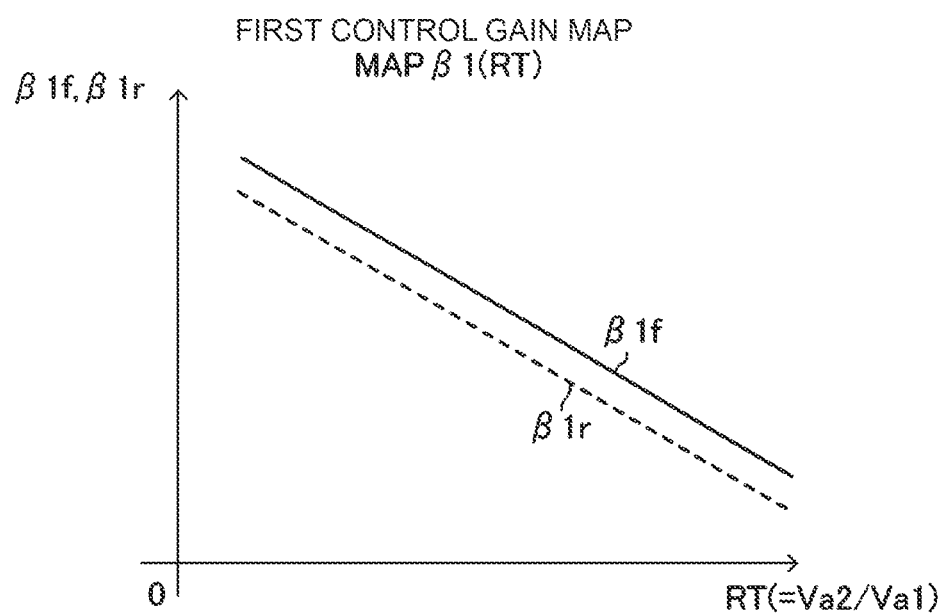
FIG. 14 is a diagram illustrating a first control gain map according to a modified example of the second embodiment of the present disclosure.
Figure 15:
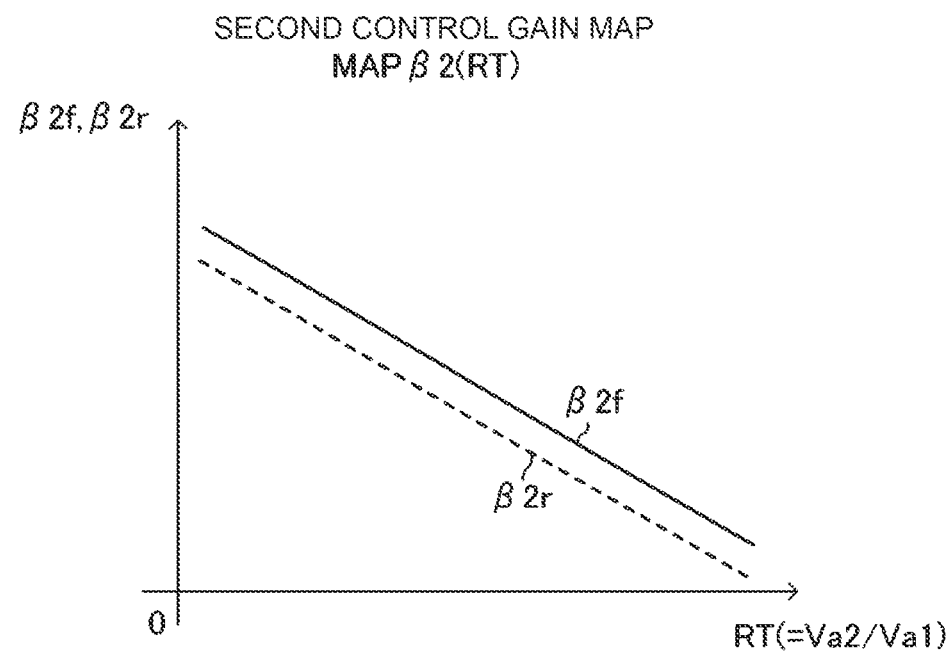
FIG. 15 is a diagram illustrating a second control gain map according to the modified example of the second embodiment of the present disclosure.

The first control gain map MAPβ1(RT) illustrated in FIG. 14 and the second control gain map MAPβ2(RT) illustrated in FIG. 15 are prestored in the ROM of the ECU 30. As illustrated in FIG. 14, the first control gain map MAPβ1(RT) defines relationships between the ratio RT and the first control gains pi (front wheel first control gain β1f and rear wheel first control gain β1r). According to the first control gain map MAPβ1(RT), the value of the first control gain β1 is defined to decrease as the ratio RT increases.

As illustrated in FIG. 15, the second control gain map MAPβ2(RT) defines relationships between the ratio RT and the second control gains β2 (front wheel second control gain β2f and rear wheel second control gain β2r). According to the second control gain map MAPβ2(RT), the value of the second control gain β2 is defined to decrease as the ratio RT increases.

The values of the first control gain β1 and the second control gain β2 are determined to decrease as the ratio RT of the second amplitude index Va2 to the first amplitude index Va1 increases. Therefore, in a case where the amplitude of the sampled displacements $z_1$smp in the high-frequency band is predicted to increase, the values of the first control gain β1 and the second control gain β2 are determined to decrease as compared to a case where the amplitude of the sampled displacements $z_1$smp in the low-frequency band is predicted to increase. Thus, when there is a strong possibility that the delayed control force difference increases, the delayed control force difference can be reduced. Accordingly, the possibility that the sprung portion 51 is vibrated greatly can be reduced.

The present disclosure is not limited to the embodiments and the modified example described above, and various modified examples may be adopted within the scope of the present disclosure.

In the embodiments and the modified example described above, the sampling zone Ssmp is described as the zone including the predicted passing position of the wheel 11. The sampling zone Ssmp need not include the predicted passing position. That is, the end point of the sampling zone Ssmp may be a position behind the predicted passing position. The start point of the sampling zone Ssmp may be a current position of the wheel 11 or a position behind the current position.

The preview reference data 45 need not be stored in the storage device 44 in the cloud 40, but may be stored in the storage device 30a. In this case, the CPU may calculate unsprung displacements $z_1$ based on vertical motion condition amounts of the sprung portion 51 or the unsprung portion 50 in each wheel 11 while the vehicle 10 is traveling, and store, as the preview reference data 45, a data set in which current positions of each wheel 11 and the unsprung displacements $z_1$ of the wheel 11 are linked together. Description is omitted for the method for determining the unsprung displacement $z_1$.

When a traveling route of the vehicle 10 is determined in advance, the CPU may download preview reference data 45 of the traveling route in advance from the cloud 40 and store the preview reference data 45 in the storage device 30a before the vehicle 10 starts to travel along the traveling route.

In place of the unsprung displacement $z_1$, the unsprung speed $dz_1$ may be stored in the preview reference data 45 while being linked to the positional information. In this case, the CPU acquires an unsprung speed $dz_1$ at the predicted passing position in Step 920 of FIG. 9, and calculates an unsprung displacement $z_1$ by integrating the unsprung speed $dz_1$ in Step 925. In Step 1010 of FIG. 10, the CPU acquires unsprung speeds $dz_1$ in the sampling zone Ssmp, and calculates unsprung displacements $z_1$ in the sampling zone Ssmp by integrating the unsprung speeds $dz_1$.

The unsprung displacement $z_1$ and the unsprung speed $dz_1$ may be stored in the preview reference data 45 while being linked to the positional information.

The target control force Fct (front wheel target control force Fcft and rear wheel target control force Fcrt) may be calculated based on Expression (11) and Expression (12) obtained by omitting the derivative term ($\beta 1f \times dz_1$) and the derivative term ($\beta 1r \times dz_1$) from Expression (7) and Expression (8), respectively. Also in this case, the actuator 54 generates control force Fc ($=\beta 2 \times z_1$) in a direction in which a component of the spring force that corresponds to the unsprung displacement $z_1$ at the predicted passing position ($K \times z_1$) is canceled out. Thus, the sprung portion 51 can be damped as compared to a case where the control force Fc is not generated.

$$Fcft = \beta 2f \times z_1 \quad (11)$$

$$Fcrt = \beta 2r \times z_1 \quad (12)$$

In this case, it is appropriate that the second control gain map be prestored in the ROM of the ECU.

The target control force Fct (front wheel target control force Fcft and rear wheel target control force Fcrt) may be calculated based on Expression (13) and Expression (14) obtained by omitting the displacement term ($\beta 2f \times z_1$) and the displacement term (($\beta 2r \times z_1$) from Expression (7) and Expression (8), respectively. Also in this case, the actuator 54 generates control force Fc ($=\beta 1 \times dz_1$) in a direction in which a component of the damping force that corresponds to the unsprung speed $dz_1$ at the predicted passing position ($C \times dz_1$) is canceled out. Thus, the sprung portion 51 can be damped as compared to a case where the control force Fc is not generated.

$$Fcft = \beta 1f \times dz_1 \quad (13)$$

$$Fcrt = \beta 1r \times dz_1 \quad (14)$$

In this case, it is appropriate that the first control gain map be prestored in the ROM of the ECU.

The target control force Fct may be calculated by using a road surface displacement $z_0$ in place of the unsprung displacement $z_1$ and a road surface displacement speed $dz_0$ that is a time derivative of the road surface displacement $z_0$ in place of the unsprung speed $dz_1$. In this case, the road surface displacement $z_0$ may be stored in the preview reference data 45 in place of the unsprung displacement $z_1$ while being linked to the positional information, and the ECU 30 may acquire a road surface displacement $z_0$ at the predicted passing position from the preview reference data 45. Further, the ECU 30 may acquire the road surface displacement $z_0$ at the predicted passing position based on a road surface displacement $z_0$ acquired by the preview sensor 33.

The preview sensor 33 is described. For example, the preview sensor 33 is attached to an upper-end inner surface of a windshield of the vehicle 10 at the center in a vehicle width direction, and detects (acquires) a target position that is a preview distance ahead of the front wheels 11F and a road surface displacement $z_0$ around the target position. In some embodiments, the preview distance is larger than a front wheel preview distance $L_{pf}$ when the vehicle speed V1 of the vehicle 10 is a maximum rated vehicle speed. FIG. 2 illustrates one preview sensor 33, but a pair of preview sensors may be provided in association with the right and left front wheels.

The "unsprung displacement $z_1$ and/or unsprung speed $dz_1$ and road surface displacement $z_0$ and/or road surface displacement speed $dz_0$" that are values related to the road surface displacement $z_0$ for use in the calculation of the target control force Fct may be referred to as "road surface displacement related values".

In Step 1025 of FIG. 10, the CPU may perform fast Fourier transform for the sampled displacements $z_1$smp, and calculate a moving average of frequency components of individual frequency bands as an amplitude index Va.

In the second embodiment, the following process is executed in place of Step 1310 to Step 1320. The CPU performs fast Fourier transform for the time series variations of the sampled displacements $z_1$smp, and calculates, as a first amplitude index, a moving average of frequency components of frequency bands included in the first frequency band. The CPU calculates, as a second amplitude index, a moving average of frequency components of frequency bands included in the second frequency band.

The calculation process for the target control force Fcrt of the rear wheel 11R is not limited to that in the example described above. For example, the CPU may calculate the target control force Fcrt based on the unsprung displacement $z_1$ at the current position of the front wheel 11F at the current time tp, and transmit a control command containing the target control force Fcrt to the rear wheel active actuator 17R at a timing delayed by a period (L/V−tpr) from the current time tp. That is, the CPU may transmit the control command containing the target control force Fcrt to the rear wheel active actuator 17R at a timing when the rear wheel 11R reaches a point behind the current position of the front wheel 11F by the rear wheel preview distance $L_{pr}$. The unsprung displacement $z_1$ at the current position of the front wheel 11F may be acquired from the preview reference data 45, or may be acquired based on a sprung acceleration $ddz_2$ or an unsprung acceleration $ddz_1$ corresponding to the position of the front wheel 11F.

Another method is described next. The CPU determines, independently of the front wheel predicted movement path, a rear wheel predicted movement path based on a current position of the rear wheel 11R, a traveling direction Td of the vehicle 10, and the positional relationship data, and determines, as the rear wheel predicted passing position, a position spaced away by the rear wheel preview distance $L_{pr}$ along the rear wheel predicted movement path. The CPU acquires an unsprung displacement $z_1$ at the rear wheel predicted passing position from the preview reference data 45, and calculates the target control force Fcrt of the rear wheel 11R based on the acquired unsprung displacement $z_1$.

The vehicle speed V1 and the traveling direction Td are acquired based on the current position of the vehicle 10 that is acquired by the GNSS receiver. The present disclosure is not limited to this case. For example, the damping control device 20 may include "wheel speed sensor and steering angle sensor" (not illustrated). The wheel speed sensor may detect a rotation speed of the wheel 11, and the CPU may calculate the vehicle speed V1 based on the rotation speed of the wheel 11. A yaw rate sensor configured to detect a yaw rate of the vehicle 10 may be provided, and the CPU may acquire the traveling direction Td based on the yaw rate and the vehicle speed V1.

The suspensions 13FR to 13RL may be any type of suspension as long as the wheels 11FR to 11RL are allowed to be displaced in the vertical direction relative to the vehicle body 10a. The suspension springs 16FR to 16RL may be arbitrary springs such as compression coil springs or air springs.

In the embodiments described above, the active actuators 17FR to 17RL are provided in correspondence with the respective wheels 11, but one active actuator 17 may be provided to at least one wheel 11. For example, the vehicle 10 may have only the front wheel active actuators 17F or the rear wheel active actuators 17R.

In the embodiments and the modified example described above, the active actuator 17 is used as the control force generating device, but the control force generating device is not limited to the active actuator 17. That is, the control force generating device may be an actuator configured to adjustably generate vertical control force for damping the sprung portion 51 based on a control command containing the target control force.

The control force generating device may be an active stabilizer device (not illustrated). The active stabilizer device includes a front wheel active stabilizer and a rear wheel active stabilizer. When the front wheel active stabilizer generates vertical control force between the sprung portion 51 and the unsprung portion 50 corresponding to the left front wheel 11FL (left front wheel control force), the front wheel active stabilizer generates control force in a direction opposite to the direction of the left front wheel control force between the sprung portion 51 and the unsprung portion 50 corresponding to the right front wheel 11FR (right front wheel control force). Similarly, when the rear wheel active stabilizer generates vertical control force between the sprung portion 51 and the unsprung portion 50 corresponding to the left rear wheel 11RL (left rear wheel control force), the rear wheel active stabilizer generates control force in a direction opposite to the direction of the left rear wheel control force between the sprung portion 51 and the unsprung portion 50 corresponding to the right rear wheel 11RR (right rear wheel control force). The structure of the active stabilizer device is incorporated herein by reference to Japanese Unexamined Patent Application Publication No. 2009-96366 (JP 2009-96366 A). The active stabilizer device may include at least one of the front wheel active stabilizer and the rear wheel active stabilizer.

The control force generating device may be a device configured to generate vertical control force Fc based on geometry of the suspensions 13FR to 13RL by increasing or reducing braking or driving force on the wheels 11 of the vehicle 10. The structure of this device is incorporated herein by reference to, for example, Japanese Unexamined Patent Application Publication No. 2016-107778 (JP 2016-107778 A). Using a predetermined method, the ECU 30 calculates braking or driving force for generating control force Fc corresponding to target control force Fct. The device includes driving devices (for example, in-wheel motors) configured to apply driving force to the wheels 11, and braking devices (brakes) configured to apply braking force to the wheels 11. The driving device may be a motor or an engine configured to apply driving force to the front wheels, the rear wheels, or the four wheels. The control force generating device may include at least one of the driving device and the braking device.

The control force generating device may be each of the adjustable shock absorbers 15FR to 15RL. In this case, the ECU 30 controls the damping coefficients C of the shock absorbers 15FR to 15RL to change damping force of the shock absorbers 15FR to 15RL by values corresponding to target control force Fct.

What is claimed is:

1. A damping control device for a vehicle, comprising:
a control force generating device configured to generate vertical control force between a vehicle body of the vehicle and at least one wheel suspended from the vehicle body by a suspension; and
an electronic control unit configured to reduce, by controlling the control force generating device to change the control force, vibration of the vehicle body that is caused by vertical vibration occurring in the wheel in response to vertical road surface displacements while the vehicle is traveling, the vertical vibration being transmitted to the vibration of the vehicle body via the suspension, wherein:
the suspension is configured to generate, in a vertical direction between the wheel and the vehicle body, a suspension force that is based on a relative displacement related value related to a vertical relative displacement between the wheel and the vehicle body;
the suspension force to be actually generated by the suspension is larger than a theoretical suspension force proportional to the relative displacement related value as an amplitude of the vibration occurring in the wheel due to the road surface displacements decreases, and the suspension force is theoretically represented by an expression including a spring term proportional to the relative displacement;
a magnitude of a component corresponding to the spring term in the suspension force to be actually generated by the suspension is larger than a magnitude of the spring term as the amplitude of the vibration occurring in the wheel due to the road surface displacements decreases; and
the electronic control unit is configured to
calculate an amplitude index indicating an amplitude of road surface displacement related values related to the road surface displacements in a predetermined sampling zone,
determine a control gain to increase, as the amplitude indicated by the amplitude index decreases, a magnitude of a target control force that is a target value of the control force at a timing when a predetermined period has elapsed from a current time, calculate, based on the control gain and the road surface displacement related values at a predicted passing position where the wheel is predicted to pass at the timing when the predetermined period has elapsed from the current time, the target control force in a direction in which a component of the suspension force that corresponds to a value related to a vertical displacement of the wheel at the predicted passing position is canceled out, control the control force generating device to generate the control force to agree with the target control force at the timing when the wheel passes through the predicted passing position, and calculate the target control force at a magnitude of a value obtained by multiplying together the control gain and the road surface displacements determined based on the road surface displacement related values at the predicted passing position, and in a direction in which a component of the spring term that corresponds to the vertical displacement of the wheel at the predicted passing position is canceled out.

2. The damping control device according to claim 1, wherein:

the electronic control unit is configured to calculate time series variations of the road surface displacement related values in the sampling zone based on a speed of the vehicle at the current time and the road surface displacement related values in the sampling zone, calculate a first amplitude index indicting an amplitude of road surface displacement related values in a predetermined first frequency band of the time series variations, calculate a second amplitude index indicating an amplitude of road surface displacement related values in a predetermined second frequency band of the time series variations that has a minimum frequency equal to or higher than a maximum frequency of the first frequency band, determine the control gain to increase as the amplitude indicated by the first amplitude index decreases, and to increase as the amplitude indicated by the second amplitude index decreases, and calculate the target control force by multiplying together the control gain and the road surface displacement related values at the predicted passing position; and an increase amount of the control gain through a decrease in the amplitude indicated by the second amplitude index is set larger than an increase amount of the control gain through a decrease in the amplitude indicated by the first amplitude index.

3. The damping control device according to claim 1, wherein the electronic control unit is configured to:

calculate time series variations of the road surface displacement related values in the sampling zone based on a speed of the vehicle at the current time and the road surface displacement related values in the sampling zone;

calculate a first amplitude index indicating an amplitude of road surface displacement related values in a predetermined first frequency band of the time series variations;

calculate a second amplitude index indicating an amplitude of road surface displacement related values in a predetermined second frequency band of the time series variations that has a minimum frequency equal to or higher than a maximum frequency of the first frequency band;

determine the control gain to decrease as a ratio of the amplitude indicated by the second amplitude index compared to the amplitude indicated by the first amplitude index increases; and calculate the target control force by multiplying together the control gain and the road surface displacement related values at the predicted passing position.

4. The damping control device according to claim 1, wherein:

the suspension force is theoretically represented by an expression including a damping term proportional to a speed of the relative displacement;

a magnitude of a component corresponding to the damping term in the suspension force to be actually generated by the suspension is larger than a magnitude of the damping term as the amplitude of the vibration occurring in the wheel due to the road surface displacements decreases; and the electronic control unit is configured to calculate the target control force at a magnitude of a value obtained by multiplying together the control gain and a time derivative of the road surface displacements determined based on the road surface displacement related values at the predicted passing position, and in a direction in which the component of the damping term that corresponds to a speed of the vertical displacement of the wheel at the predicted passing position is canceled out.

5. The damping control device according to claim 1, wherein:

the suspension force is theoretically represented by an expression including a spring term proportional to the relative displacement and a damping term proportional to a speed of the relative displacement;

a magnitude of a component corresponding to the spring term in the suspension force to be actually generated by the suspension is larger than a magnitude of the spring term as the amplitude of the vibration occurring in the wheel due to the road surface displacements decreases;

a magnitude of a component corresponding to the damping term in the suspension force to be actually generated by the suspension is larger than a magnitude of the damping term as the amplitude of the vibration occurring in the wheel due to the road surface displacements decreases; and the electronic control unit is configured to determine a first control gain and a second control gain to increase the target control force as the amplitude indicated by the amplitude index decreases, calculate first target control force at a magnitude of a value obtained by multiplying together the first control gain and a time derivative of the road surface displacements determined based on the road surface displacement related values at the predicted passing position, and in a direction in which the component of the damping term that corresponds to a speed of the vertical displacement of the wheel at the predicted passing position is canceled out, calculate second target control force at a magnitude of a value obtained by multiplying together the second control gain and the road surface displacements determined based on the road surface displacement related values at the predicted passing position and in a direction in which the component of the spring term that corresponds to the vertical displacement of the wheel at the predicted passing position is canceled out, and control the control force generating device to generate resultant force of the first target control force and the second target control force at the timing when the wheel passes through the predicted passing position.

6. A damping control method for reducing, by controlling a control force generating device to change vertical control force, vibration of a vehicle body of a vehicle that is caused by vertical vibration occurring in at least one wheel suspended from the vehicle body by a suspension in response to vertical road surface displacements while the vehicle is traveling, the vertical vibration being transmitted to the vibration of the vehicle body via the suspension, the control force generating device being configured to generate the control force between the wheel and the vehicle body, the suspension being configured to generate, in a vertical direction between the wheel and the vehicle body, a suspension force that is based on a relative displacement related value related to a vertical relative displacement between the wheel and the vehicle body, the suspension force to be generated by the suspension being larger than a theoretical suspension force proportional to the relative displacement related value as an amplitude of the vibration occurring in the wheel due to the road surface displacements decreases, and, a magnitude of a component corresponding to the spring term in the suspension force to be actually generated by the suspension is larger than a magnitude of the spring term as the amplitude of the vibration occurring in the wheel due to the road surface displacements decreases, the damping control method comprising:

calculating an amplitude index indicating an amplitude of road surface displacement related values related to the road surface displacements in a predetermined sampling zone;

determining a control gain to increase, as the amplitude indicated by the amplitude index decreases, a magnitude of a target control force that is target value of the control force at a timing when a predetermined period has elapsed from a current time;

calculating, based on the control gain and the road surface displacement related values at a predicted passing position where the wheel is predicted to pass at the timing when the predetermined period has elapsed from the current time, the target control force in a direction in which a component of the suspension force that corresponds to a value related to a vertical displacement of the wheel at the predicted passing position is canceled out; and controlling the control force generating device to generate the control force to agree with the target control force at the timing when the wheel passes through the predicted passing positon; and calculating the target control force at a magnitude of a value obtained by multiplying together the control gain and the road surface displacements determined based on the road surface displacement related values at the predicted passing position, and in a direction in which a component of the spring term that corresponds to the vertical displacement of the wheel at the predicted passing position is canceled out.

* * * * *